Oct. 10, 1961  F. W. POWELL ET AL  3,003,229
CAMERA TESTING AND ASSEMBLING MACHINE
Filed May 23, 1958  19 Sheets-Sheet 1

FRED W. POWELL
WAYNE K. WIGHT
WILLIAM C. FLANAGAN
INVENTORS

BY R. Frank Smith

ATTORNEYS

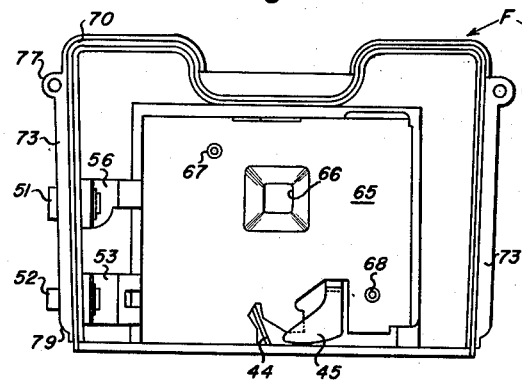
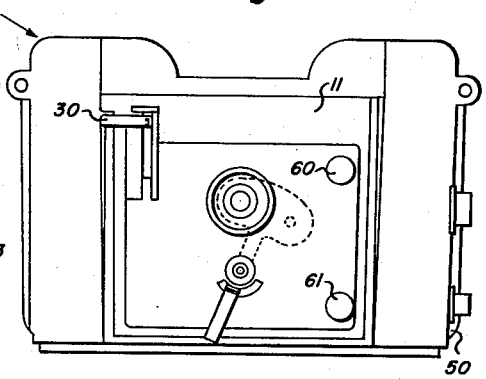
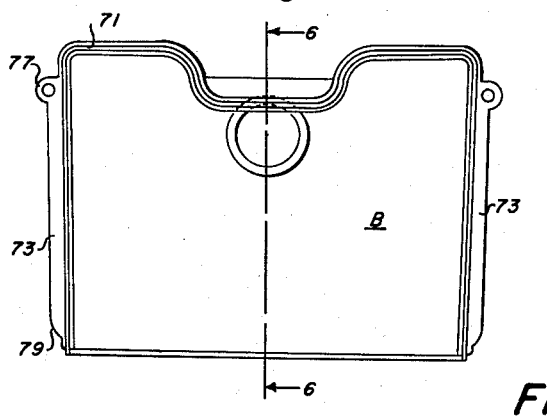
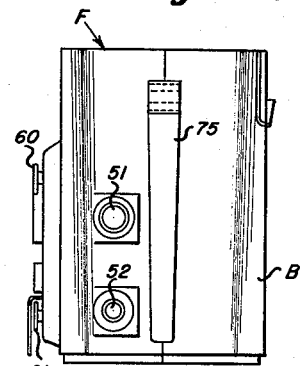
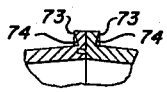
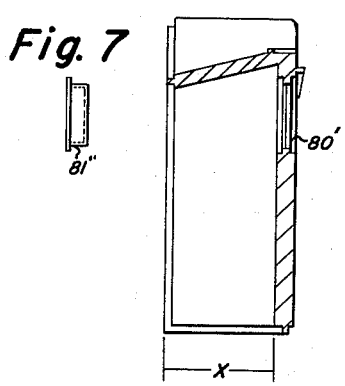
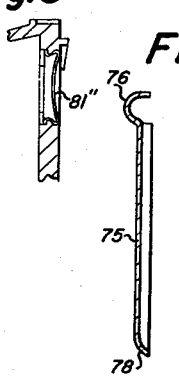

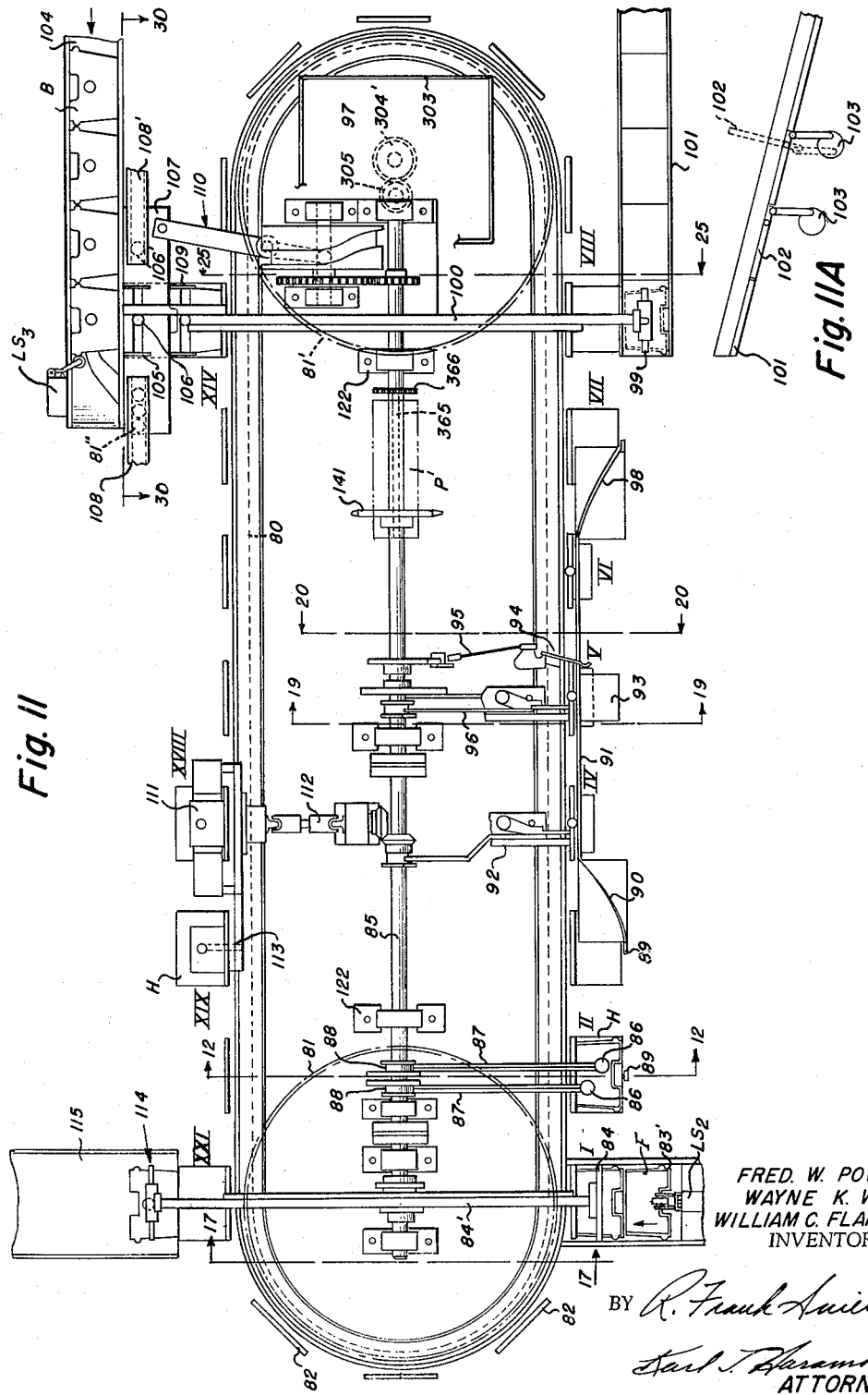

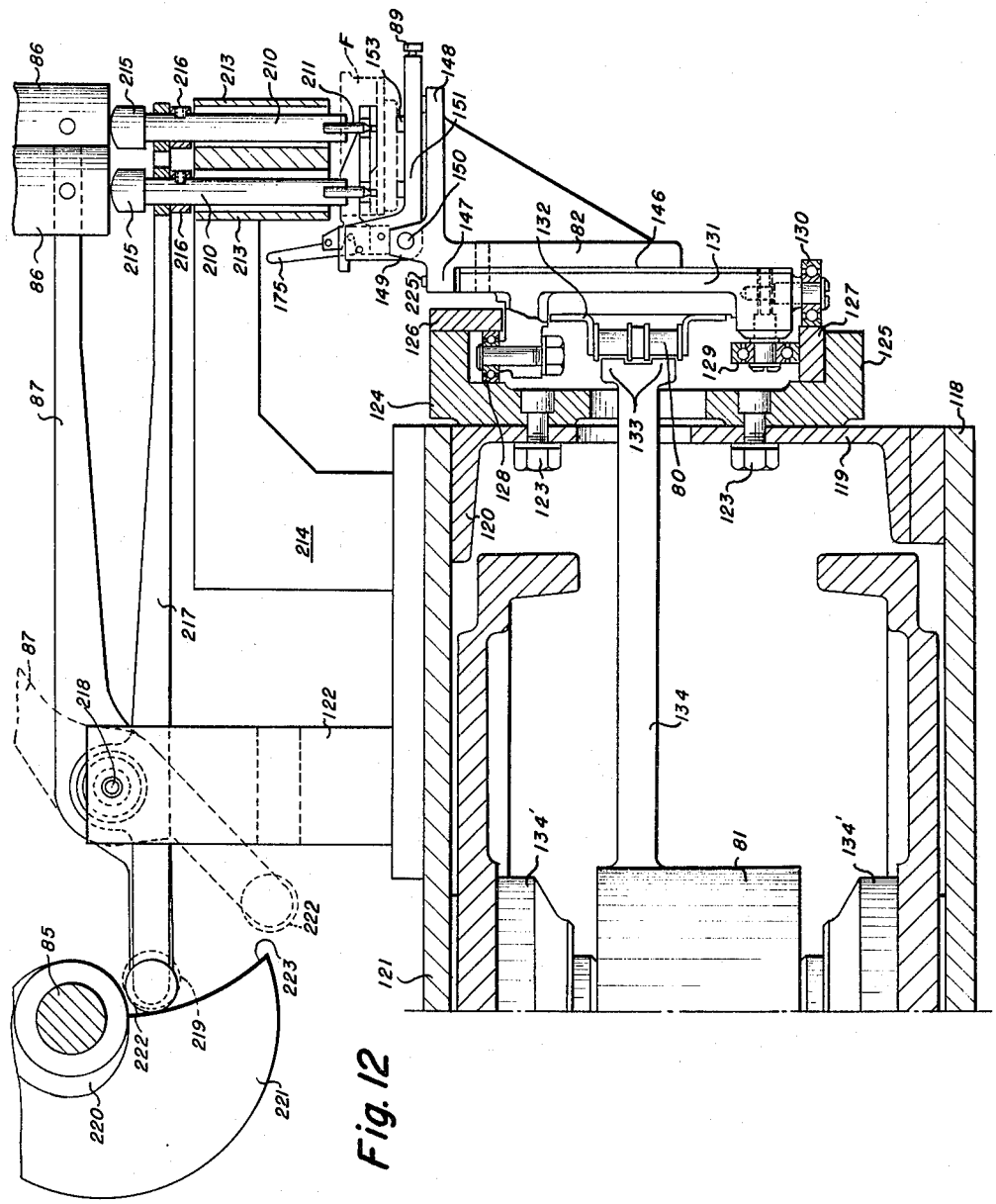

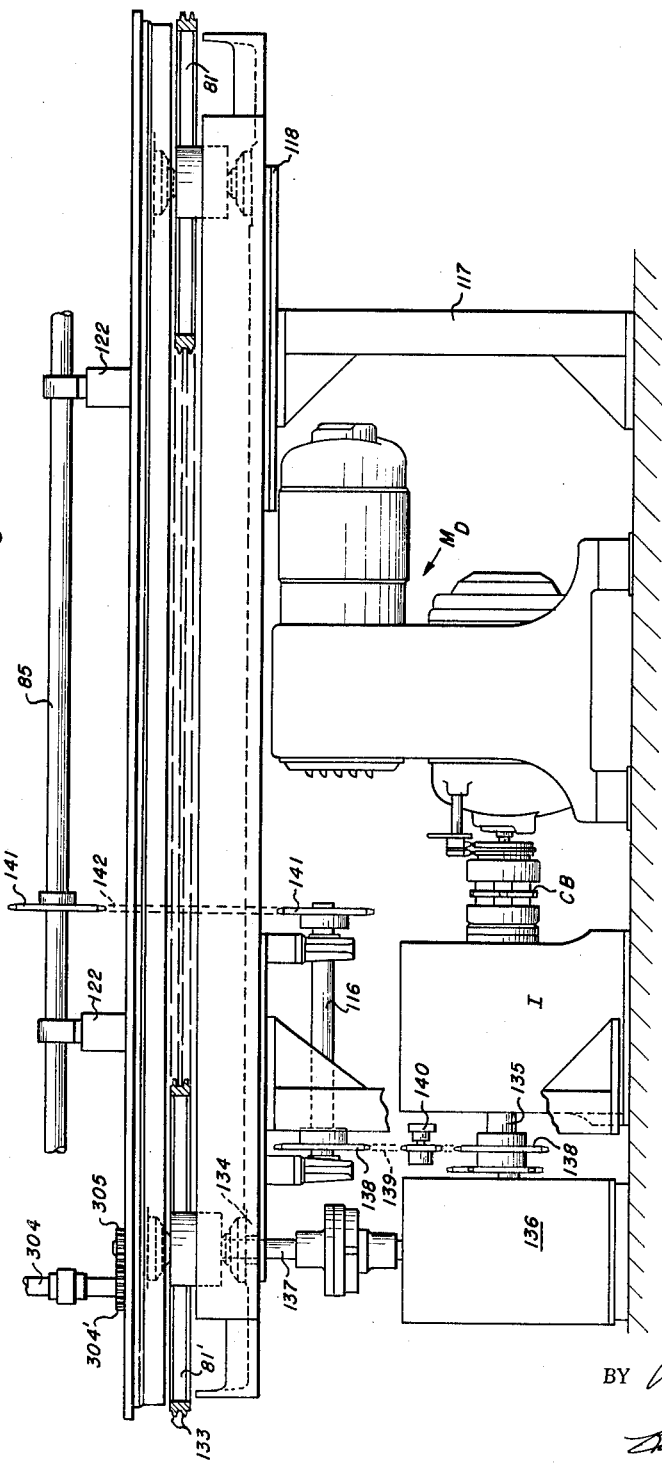

Oct. 10, 1961　　F. W. POWELL ET AL　　3,003,229
CAMERA TESTING AND ASSEMBLING MACHINE
Filed May 23, 1958　　19 Sheets-Sheet 6

FRED W. POWELL
WAYNE K. WIGHT
WILLIAM C. FLANAGAN
INVENTORS

BY R. Frank Smith

ATTORNEYS

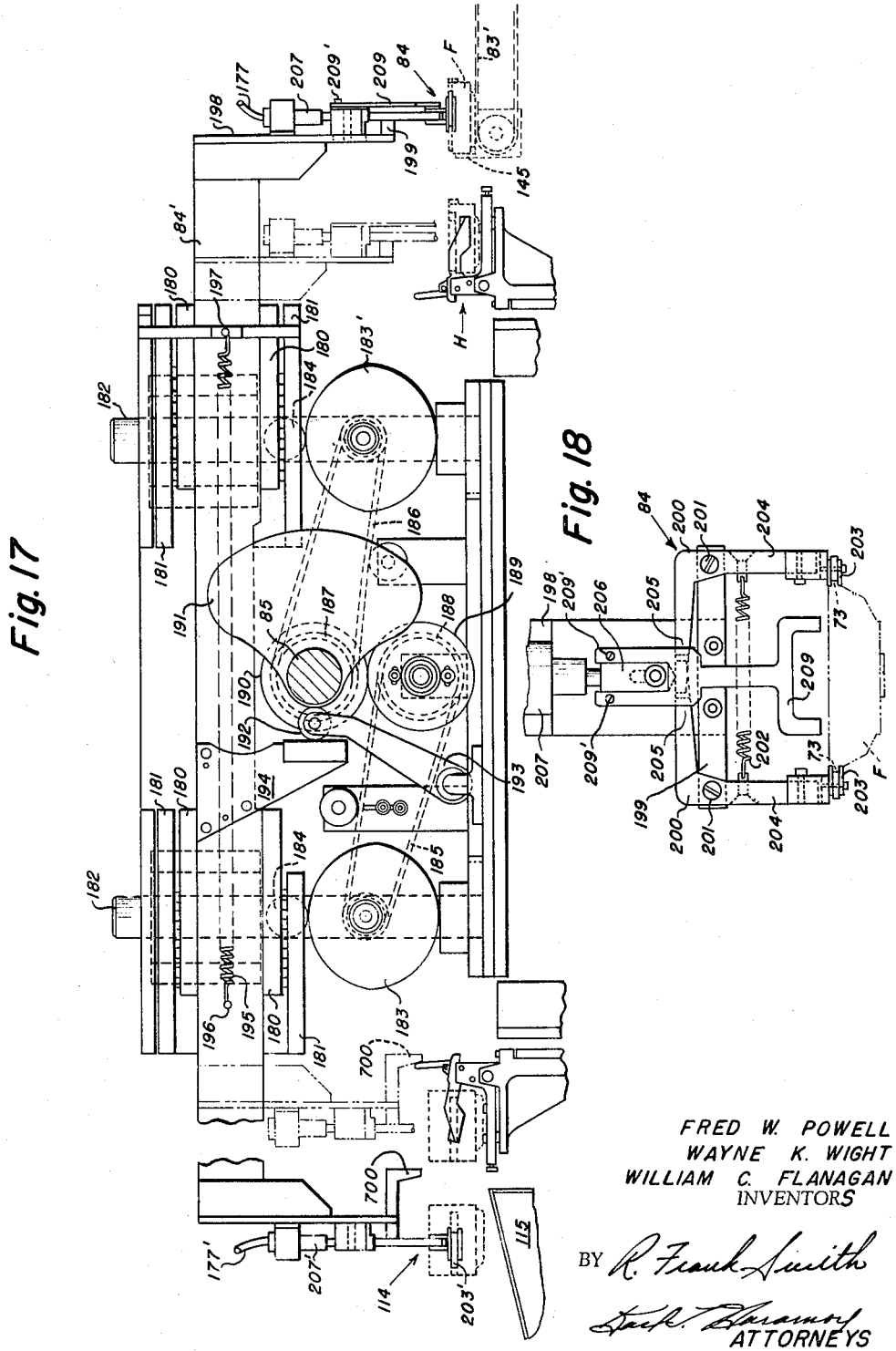

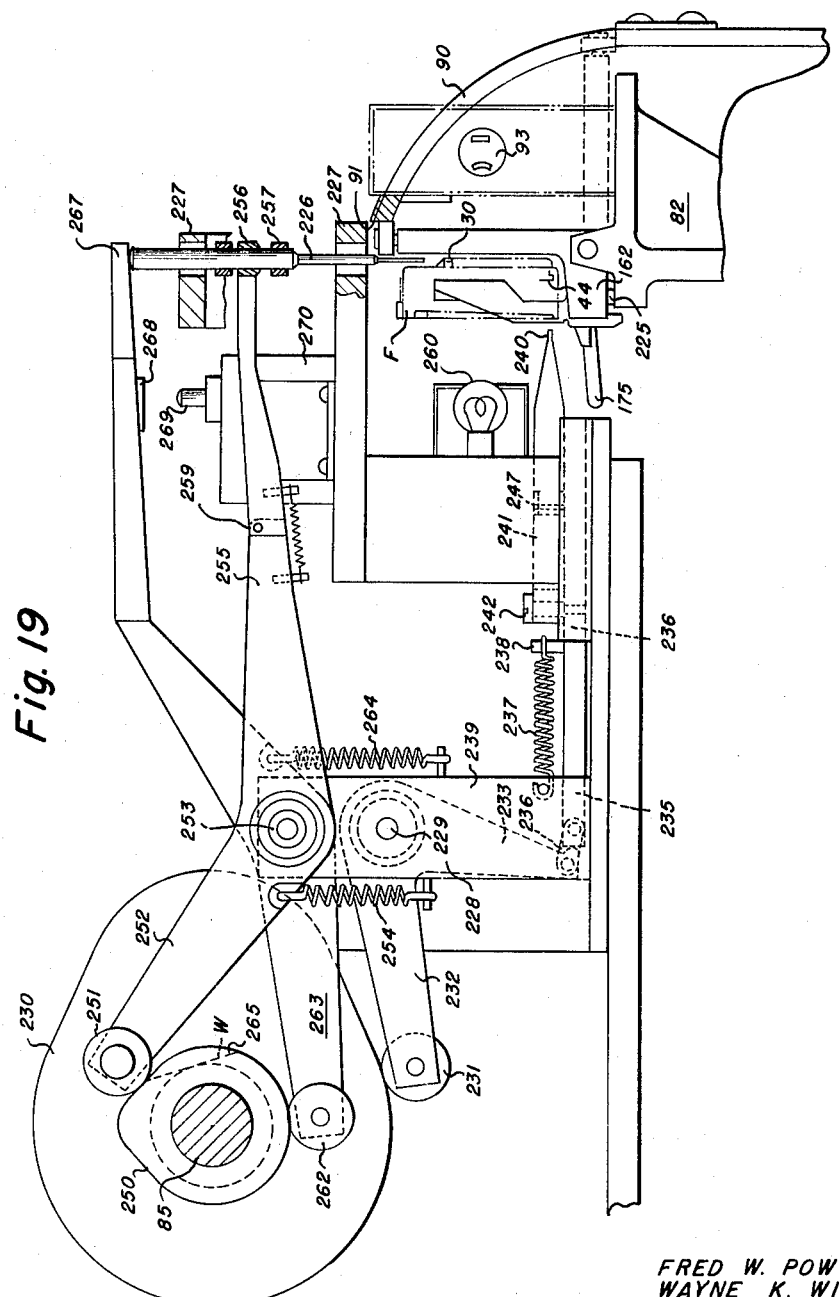

Oct. 10, 1961
F. W. POWELL ET AL
3,003,229
CAMERA TESTING AND ASSEMBLING MACHINE
Filed May 23, 1958
19 Sheets-Sheet 9
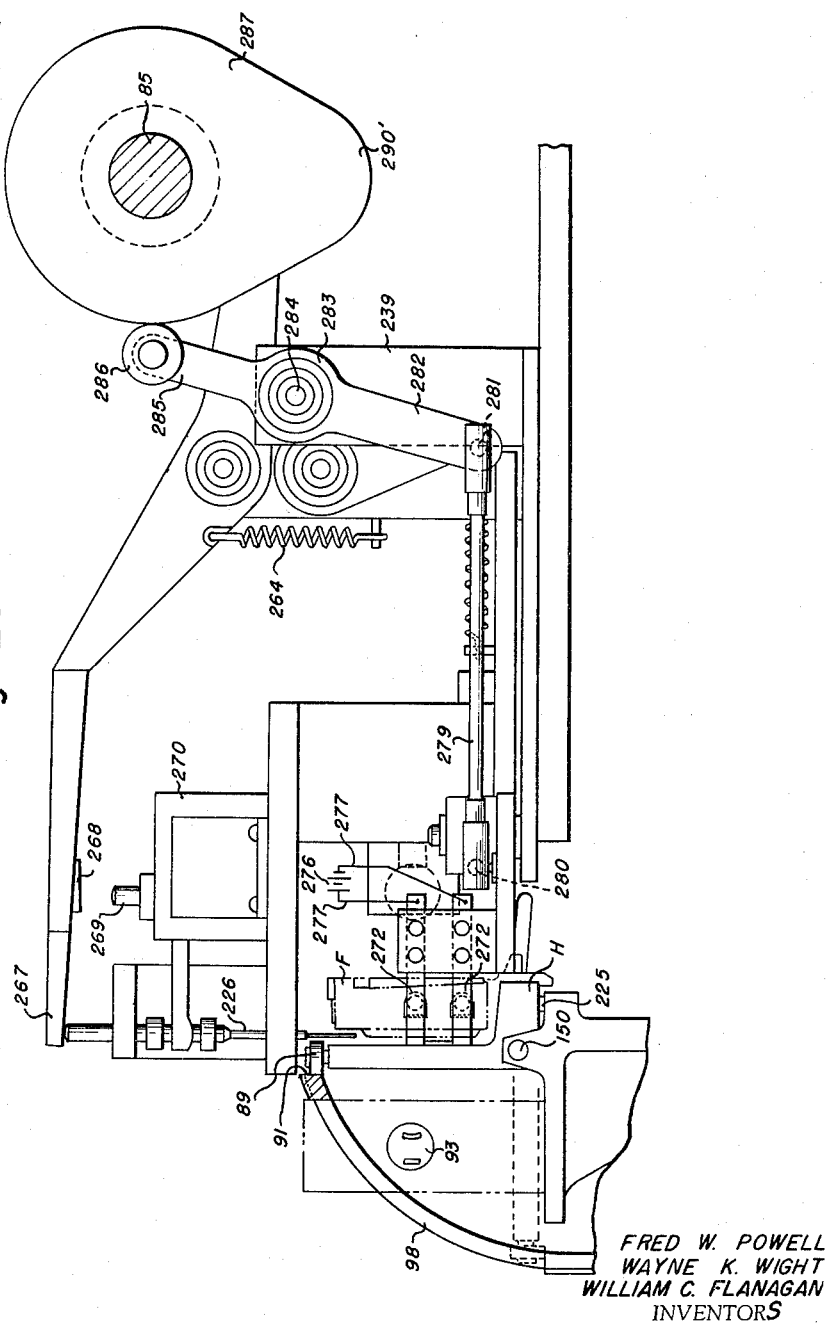
FRED W. POWELL
WAYNE K. WIGHT
WILLIAM C. FLANAGAN
INVENTORS
BY
ATTORNEYS

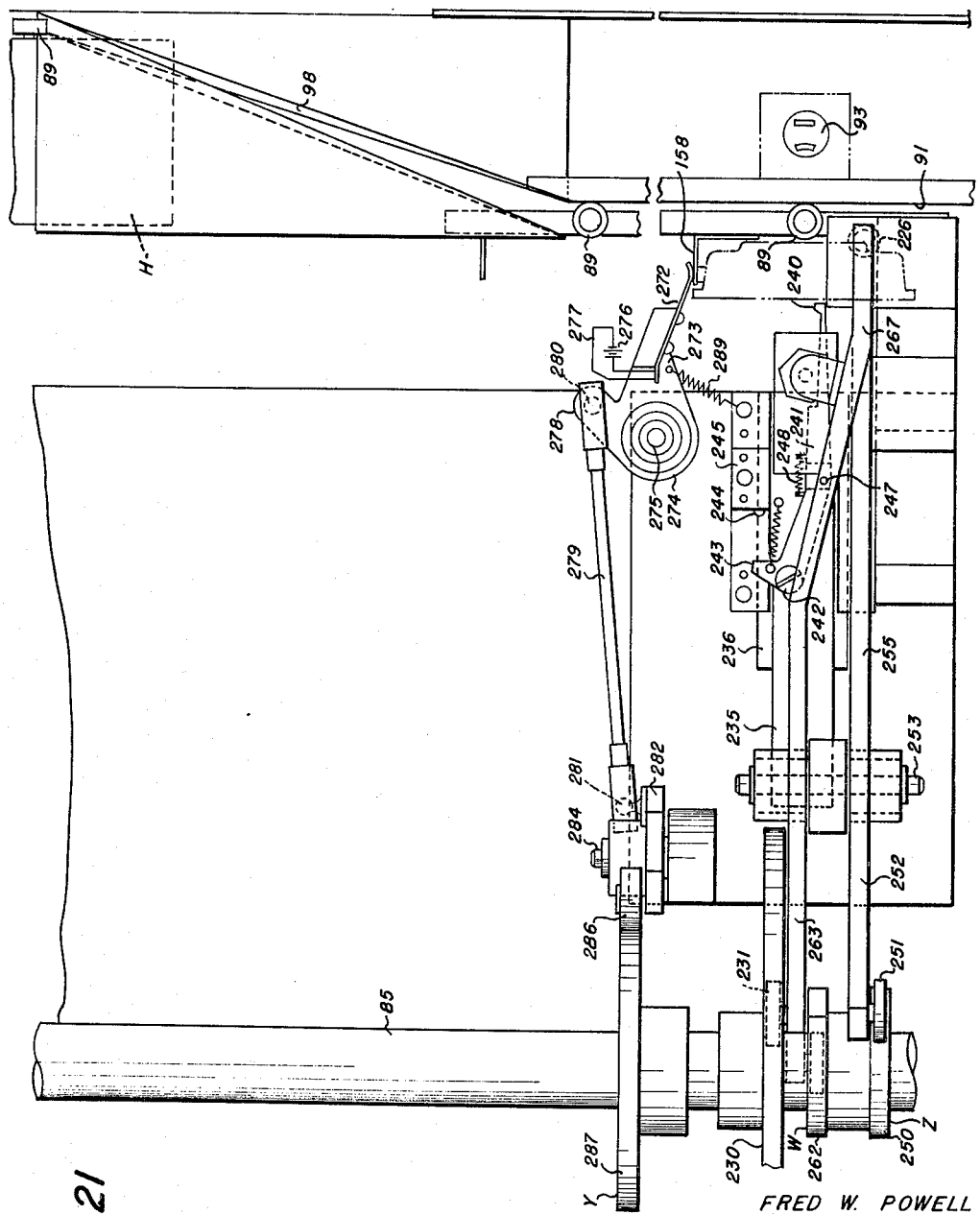

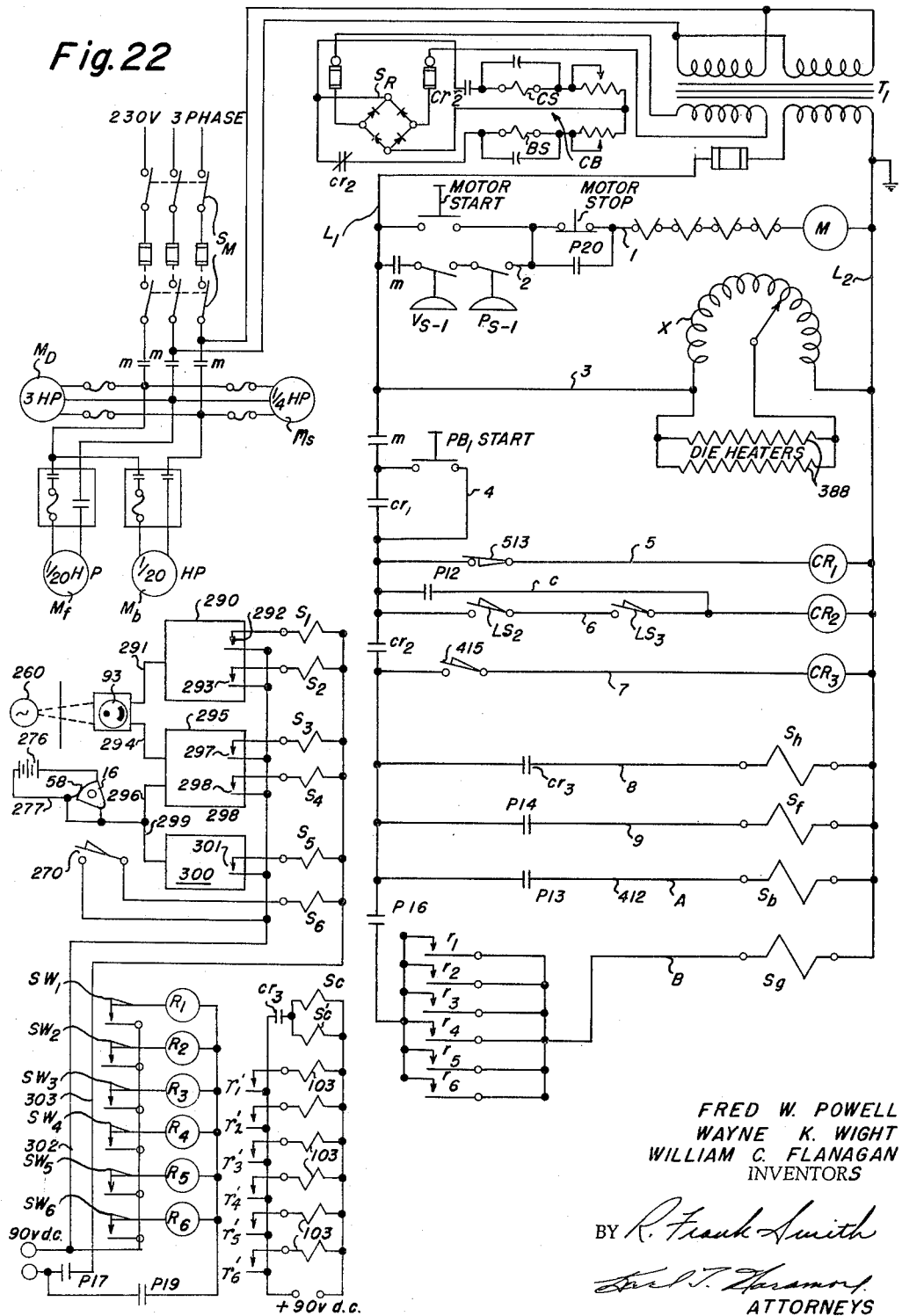

Oct. 10, 1961 F. W. POWELL ET AL 3,003,229
CAMERA TESTING AND ASSEMBLING MACHINE
Filed May 23, 1958 19 Sheets-Sheet 12

FRED W. POWELL
WAYNE K. WIGHT
WILLIAM C. FLANAGAN
INVENTORS

BY
ATTORNEYS

Oct. 10, 1961 F. W. POWELL ET AL 3,003,229
CAMERA TESTING AND ASSEMBLING MACHINE
Filed May 23, 1958 19 Sheets-Sheet 13

FRED W. POWELL
WAYNE K. WIGHT
WILLIAM C. FLANAGAN
INVENTORS

BY
ATTORNEYS

Oct. 10, 1961  F. W. POWELL ET AL  3,003,229
CAMERA TESTING AND ASSEMBLING MACHINE
Filed May 23, 1958  19 Sheets-Sheet 14
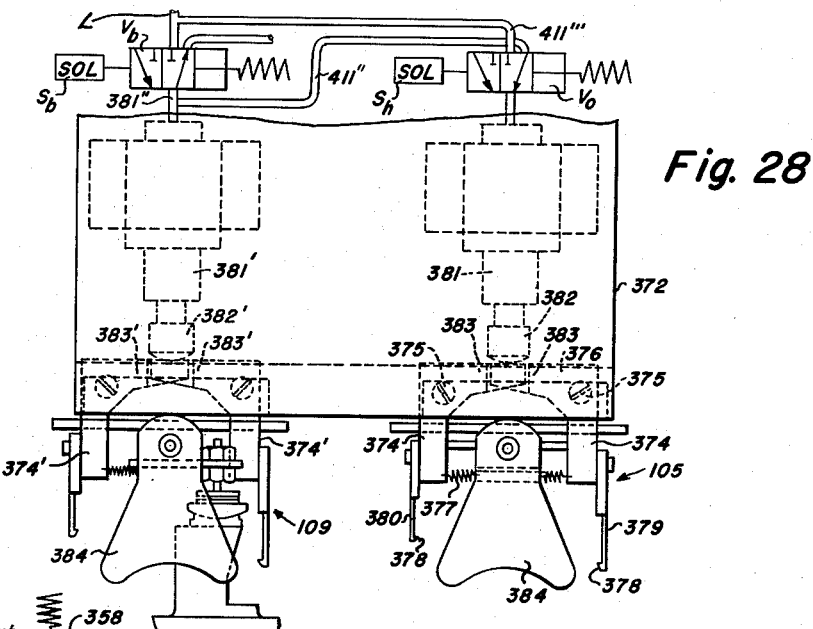
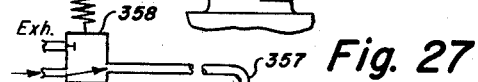
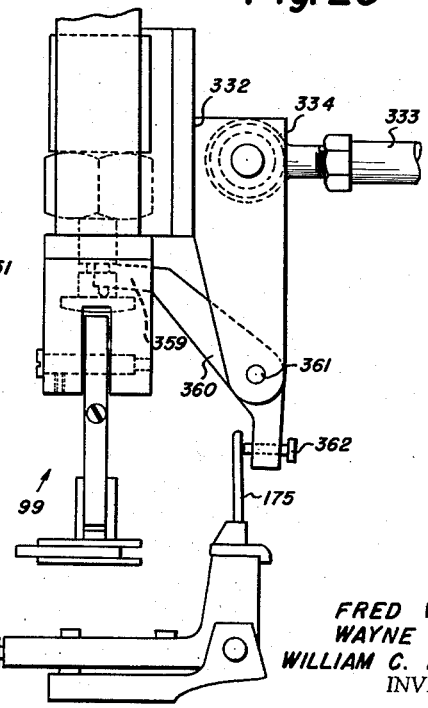
FRED W. POWELL
WAYNE K. WIGHT
WILLIAM C. FLANAGAN
INVENTORS
BY
ATTORNEYS Oct. 10, 1961 F. W. POWELL ET AL 3,003,229
CAMERA TESTING AND ASSEMBLING MACHINE
Filed May 23, 1958 19 Sheets-Sheet 15
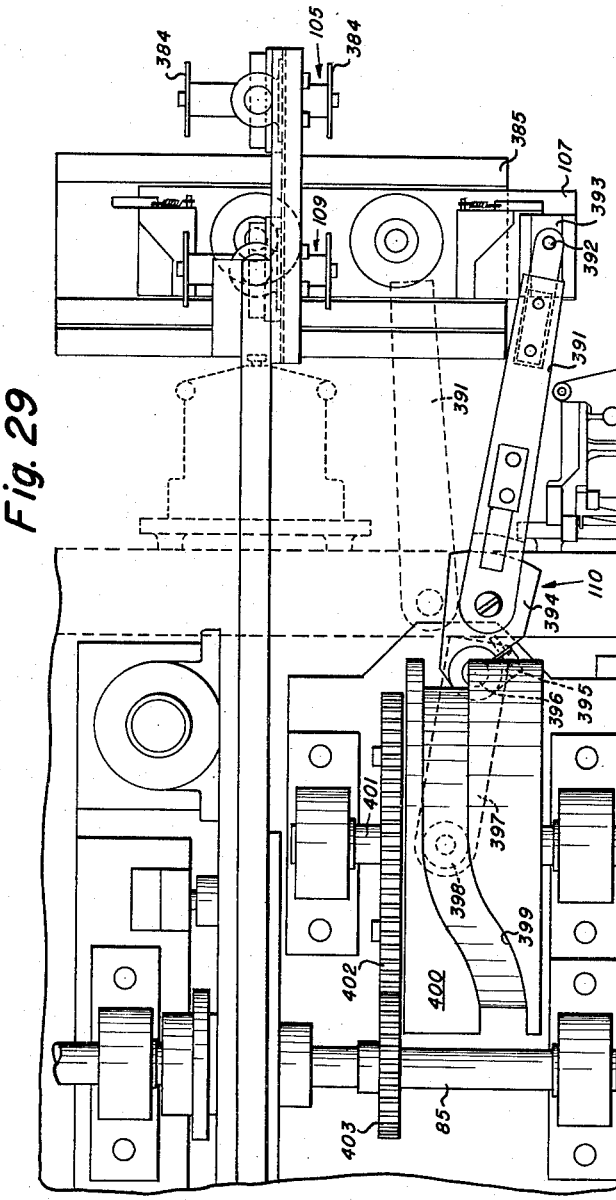
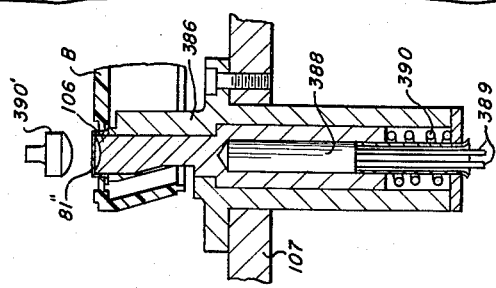
FRED W. POWELL
WAYNE K. WIGHT
WILLIAM C. FLANAGAN
INVENTORS
ATTORNEYS

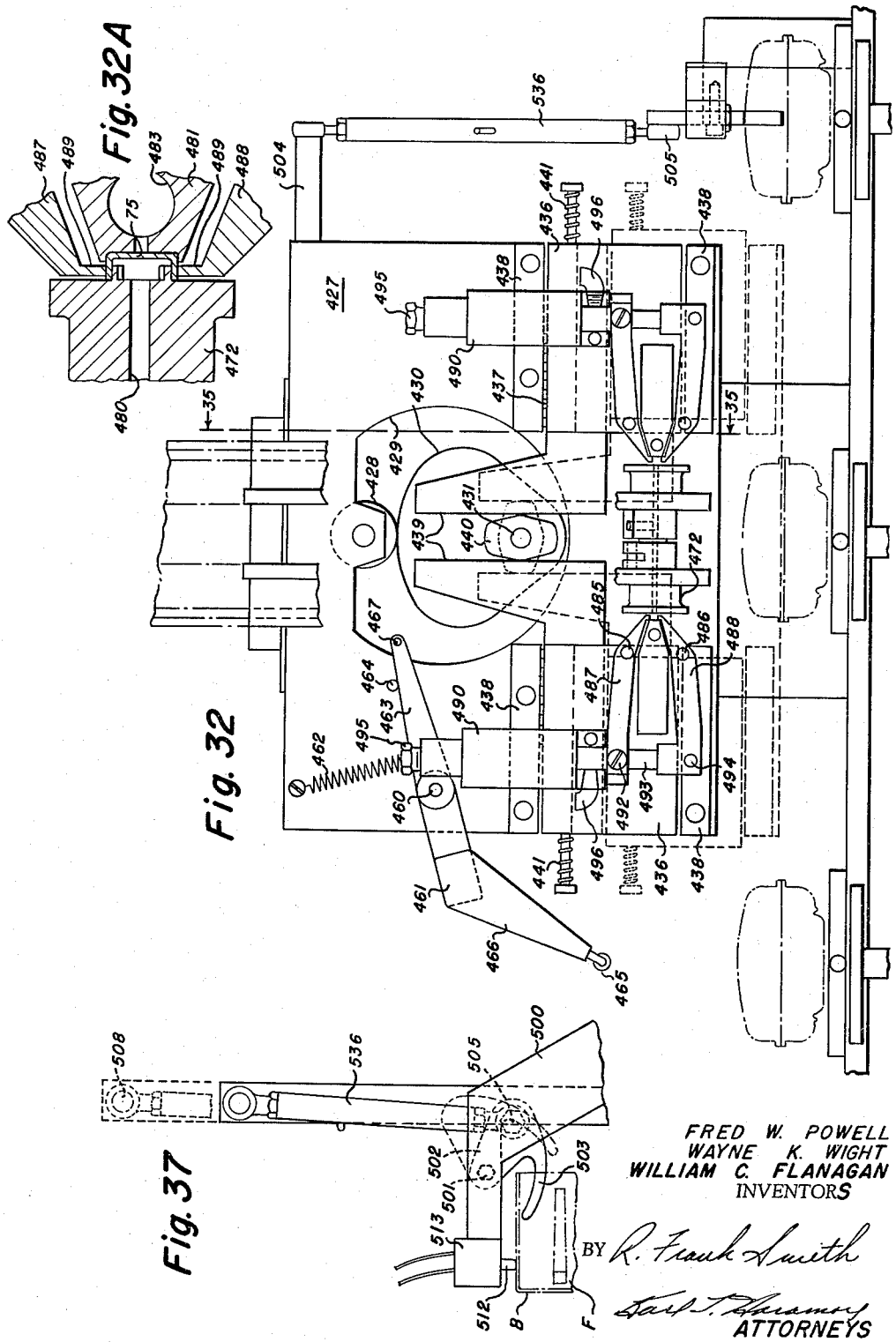

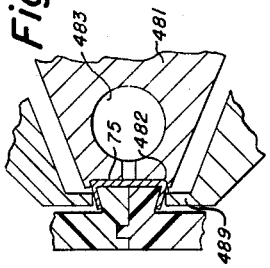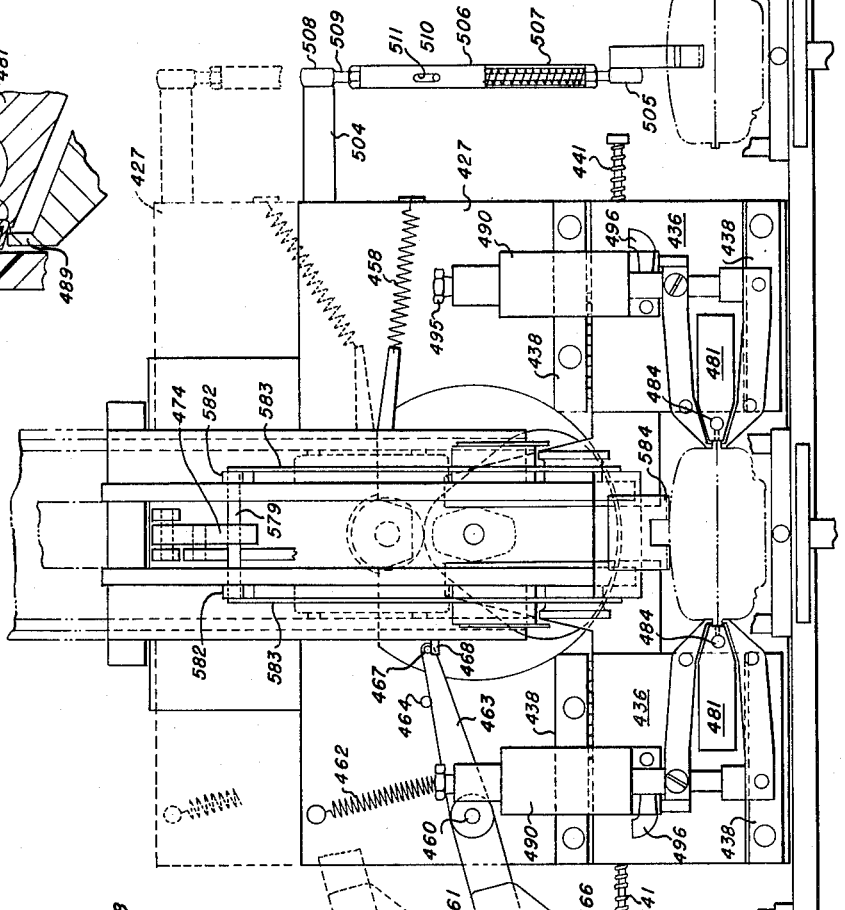

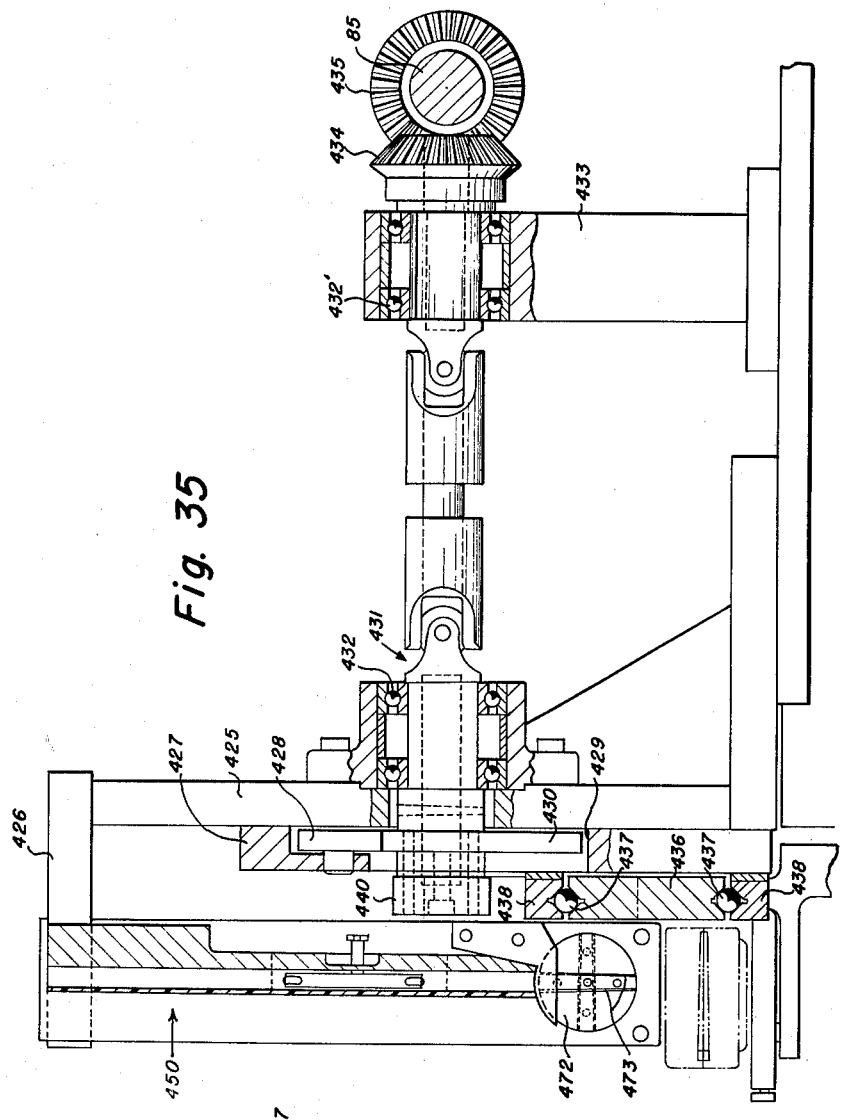
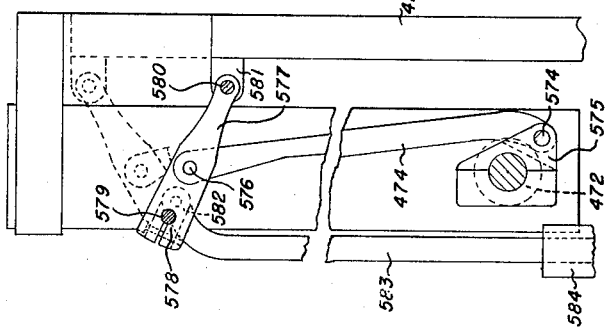

PROGRAM SWITCH OPERATING SEQUENCE DIAGRAM

FRED W. POWELL
WAYNE K. WIGHT
WILLIAM C. FLANAGAN
INVENTORS

BY
ATTORNEYS

United States Patent Office 3,003,229
Patented Oct. 10, 1961

3,003,229
CAMERA TESTING AND ASSEMBLING MACHINE
Fred W. Powell, Wayne K. Wight, and William C. Flanagan, Rochester, N.Y., assignors to Eastman Kodak Company, Rochester, N.Y., a corporation of New Jersey
Filed May 23, 1958, Ser. No. 737,447
14 Claims. (Cl. 29—208)

The present invention relates to a semi-automatic machine for partially assembling a well-known box camera, making certain tests of the camera mechanism and assembly during the assembly operation, and sorting out those units which fail certain of the tests for one reason or another.

A well-known box camera on the market has a flash shutter which is cocked when the film is wound and has a double exposure prevention mechanism, well known in the art and hereinafter referred to as a d.e.p. mechanism, which prevents a second actuation of the shutter until the film is advanced. This camera is made of a plastic material and comprises a front to which the shutter mechanism is mounted in covering relation to an exposure aperture, and a back having the usual red window for observing the exposure numbers on the film. The back is assembled in a light-tight manner to the front by means of metal clips which clamp over mating undercut tongues on the sides of each of these parts when they are placed one on the other. Furthermore, the shutter mechanism on the front wall is covered and protected by a metal plate which is riveted in place on the camera front.

The primary object of the present invention is to provide a semi-automatic machine which will make certain subassemblies as to the camera front and the camera back, and then assemble the completed backs onto the completed fronts in a continuous operation.

Another object is to provide a machine of the type described which is adapted to perform certain mechanical and electrical tests on the shutter, and to automatically reject from the assembly line, before the back is assembled to the front, any shutter which fails to meet any one of certain specified requirements.

And still another object is to provide a machine of the type described which classifies the rejects according to the type of failure, so that the rejects can be readily inspected or repaired without checking them for all the tests.

And another object is to provide a machine of the type described wherein the camera parts are moved successively through a plurality of stations where the different tests are performed and the subassemblies are assembled together in an automatic manner.

And yet another object is to provide a camera assembling and testing machine of the type described in which the camera fronts with the shutter assembled thereon are intermittently picked off a feed conveyor and fed onto successive fixtures or holders carried at spaced intervals on an endless chain which is intermittently indexed through a plurality of stations where a shutter cover plate is assembled to the camera front and tests of the shutter are made. Those shutters failing the tests are automatically picked off their holder and placed in selected reject chutes. At a later station the red window is mounted in the camera backs fed to the machine by a conveyor and then the completed back is automatically picked up and placed on a front which has passed all inspections. The back pickup mechanism is automatically incapacitated when an empty fixture approaches this station so that no back will be placed on an empty fixture. The combined fronts and backs are then indexed to an assembly station where metal clips are automatically placed on and clamped over tongues on both parts to hold the fronts and backs together. At a succeeding station the assembly of the two camera parts are tested and if they are not firmly clamped, the machine is automatically stopped so that this unit can be removed. The assembled backs and fronts then move to a take-off station where they pass to further assembly operations. The fixtures then index on to the load position where another front is applied and the complete operation is repeated.

The novel features that we consider characteristic of our invention are set forth with particularity in the appended claims. The invention itself, however, both as to its organization and its mode of operation, together with additional objects and advantages thereof, will best be understood from the following description when read in connection with the accompanying drawings in which:

FIG. 3 is an elevational view of the camera front with a cover plate mounted in covering relation with the shutter mechanism;

FIG. 4 is an elevational view of the camera front looking at it from the outside, or the side opposite to that shown in FIG. 3;

FIG. 5 is an elevational view looking into the camera back which is to be assembled onto the camera front shown in FIGS. 3 and 4;

FIG. 6 is a sectional view of the camera back taken substantially on line 6—6 of FIG. 5;

FIG. 7 is a side elevational view of the red window which is adapted to be mounted in the hole in the camera back;

FIG. 8 is a sectional detail showing how the red window is assembled into the hole in the camera back by the machine of this invention;

FIG. 9 is a sectional detail showing how mating tongues on the camera back and camera front joint when the camera fronts and camera backs are assembled one on the other by the present machine;

FIG. 10 is a vertical section of the metal clip which is slipped onto the mating tongues on the two camera parts and crimped over to hold the parts in assembled relation;

FIG. 10A is a side elevational view of an assembled camera front and camera back made on the present machine;

FIG. 11 is a schematic plan view of the entire assembling and testing machine constructed in accordance with the present invention, and showing the relative location of the twenty-four stations through which the camera parts are moved for assembly and testing purposes;

FIG. 11A is a schematic elevational detail of the reject chute of the machine showing how the different doors are operated to classify the rejects according to type;

FIG. 12 is an enlarged sectional detail taken substantially on line 12—12 of FIG. 11, and showing the drive and supporting mechanism for the fixtures for carrying the camera parts as well as the mechanism for staking the cover plate over the shutter mechanism;

FIG. 13 is a side elevational view of the machine showing the drive mechanism for the indexing chain and the cam shaft;

FIGS. 14 and 15 are plan and side elevational views, respectively, of the camera supporting fixture, in a closed condition;

FIG. 16 is a side elevational view of the fixture in an open position to receive or permit take-off of a camera part;

FIG. 17 is an enlarged view taken substantially on line 17—17 of FIG. 11 showing stations I and XXI of the machine. For sake of clarity the gripper for picking up the camera front from the feed-in conveyor and the gripper for taking the assembled camera body from the conveyor chain are each shown in solid lines in their extreme outer positions, whereas actually these two grippers reciprocate together so that when one is in its extreme outer position relative to the conveyor chain, the other is over the chain. In other words, when gripper 84 is in its solid line position shown in FIG. 17, the gripper 114 will be in its broken line position, and vice versa. The bar 84' to which each of these grippers is fixed is shown broken adjacent gripper 114 to make this showing consistent;

FIG. 18 is an enlarged front elevation of the gripper 84 shown in FIG. 17 for lifting camera fronts onto the fixtures on the conveyor chain;

FIG. 19 is an enlarged view taken substantially on line 19—19 of FIG. 11 showing the shutter tripping mechanism at station V;

FIG. 20 is an enlarged view taken substantially on line 20—20 of FIG. 11 showing the mechanism for connecting the shutter contacts of the camera front into the testing circuit;

FIG. 21 is an enlarged plan view of that portion of the machine at station V, and embracing the mechanism shown in FIGS. 19 and 20.

Figure 24:
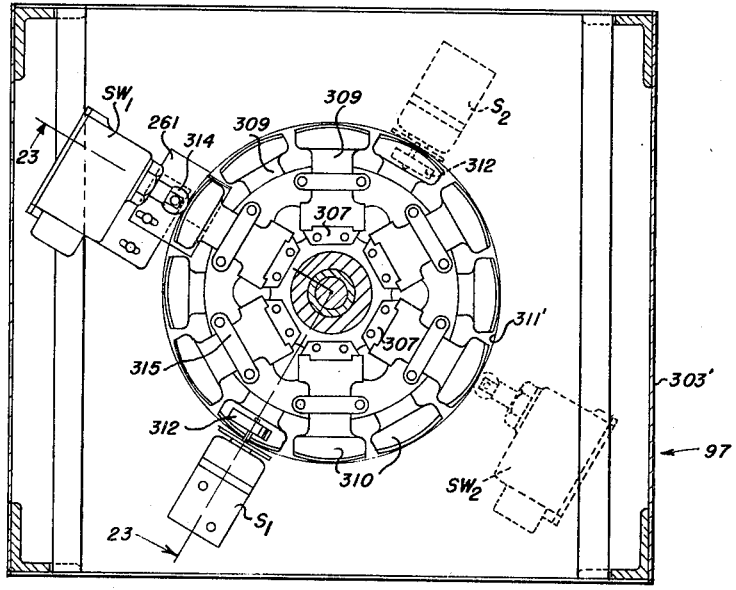
Figure 23:
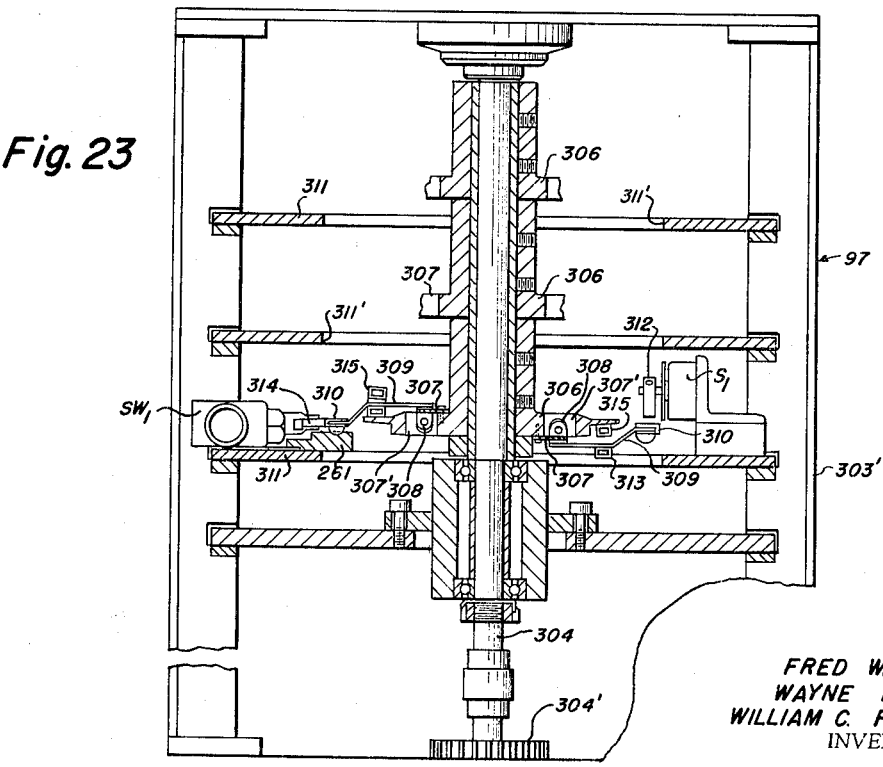
Figure 25:
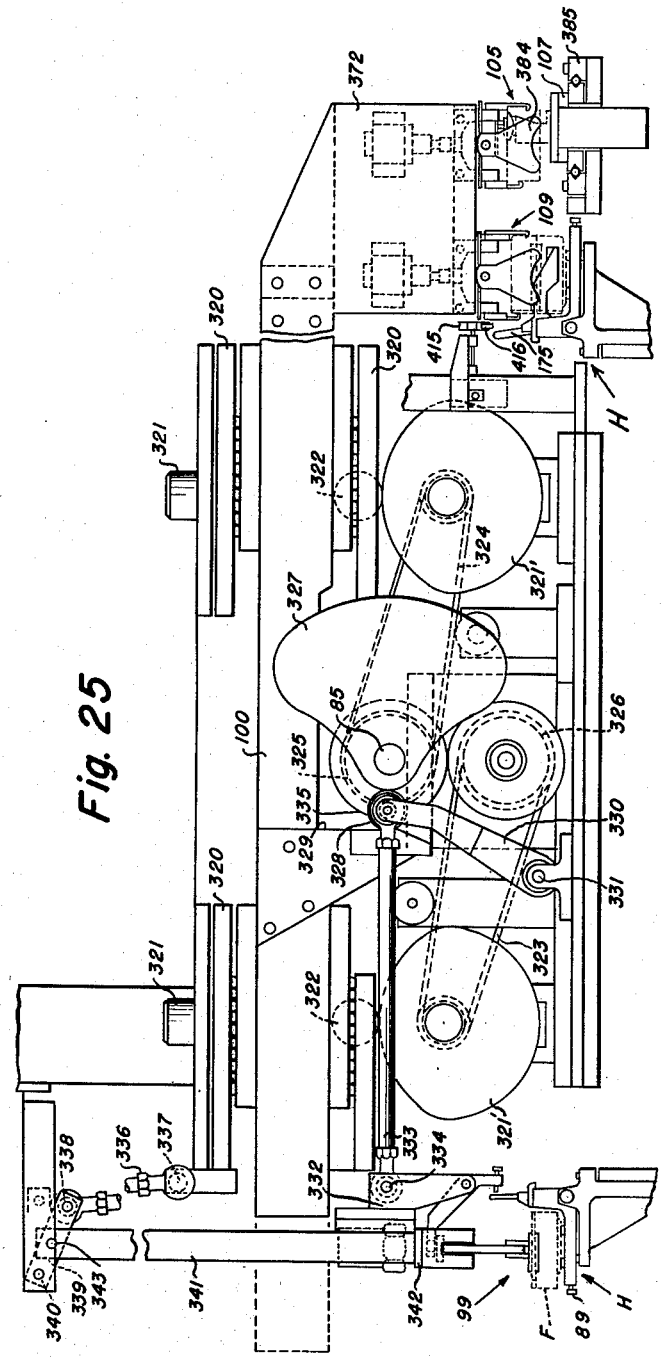
Figure 38:
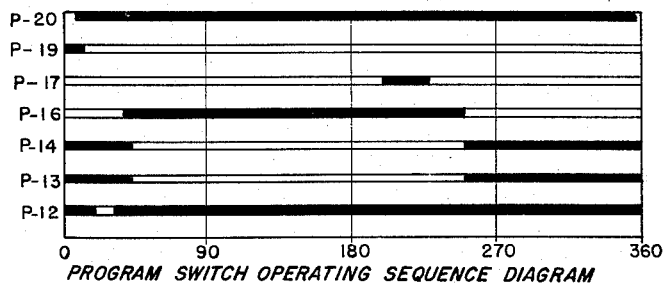

FIG. 22 is a schematic wiring diagram of the electrical control system of the over-all machine;

FIG. 23 is a vertical sectional view of a quadrant of the memory unit of the machine or a section taken substantially on lines 23—23 of FIG. 24;

FIG. 24 is a horizontal section taken through the memory device above one of the platforms therein;

FIG. 25 is an elevational view taken substantially on line 25—25 of FIG. 11 and showing stations VIII and XIV of the machine;

FIG. 26 is an enlarged side elevation showing the reject gripper 99;

FIG. 27 is an enlarged front elevation of the gripper shown in FIG. 26;

FIG. 28 is a side elevational view of the grippers 105 and 109 at station XIV and schematically showing the valve system for operating the air cylinder thereof;

FIG. 29 is an enlarged detail plan view of that portion of the machine including stations XIII and XIV and showing the drive mechanism for the shuttle carrying the die members to and from the red window chutes where they alternately pick up red windows;

FIG. 30 is an enlarged detail elevational view taken substantially on line 30—30 of FIG. 11 and showing the ends of the red window chutes and the cooperation therewith of the die shuttle;

FIG. 32 is a front elevational view of the clip applying heated die members;

FIG. 31 is a front elevational view of the clip applying mechanism at station XVIII of the machine, and showing the mechanism in a raised position it assumes during indexing of the fixture carrying chain;

FIG. 32A is an enlarged sectional detail showing how how the clip gripping and crimping means engages the clips on the spool ends;

FIG. 33 is a view similar to FIG. 32 but showing the mechanism in a lowered position where the clips are applied to the camera parts to clamp them together;

FIG. 33A is a sectional detail showing how the clips are applied to and crimped over the mating tongues on the camera parts;

FIG. 34 is a front elevational detail showing the clip feeding means;

FIG. 35 is a vertical section taken substantially on line 35—35 of FIG. 32 and showing the driving mechanism for the clip applying mechanism;

FIG. 36 is a side elevation, partly in section, showing the linkage for oscillating the clip-carrying spool between its two positions and moving the presser foot between its two positions when the clip applying mechanism reciprocates up and down;

FIG. 37 is a side elevational view of the mechanism at station XIX for testing the assembly of the clips to the camera parts;

FIG. 38 is a chart showing the operating sequence of the program cams; and

Figure 39:
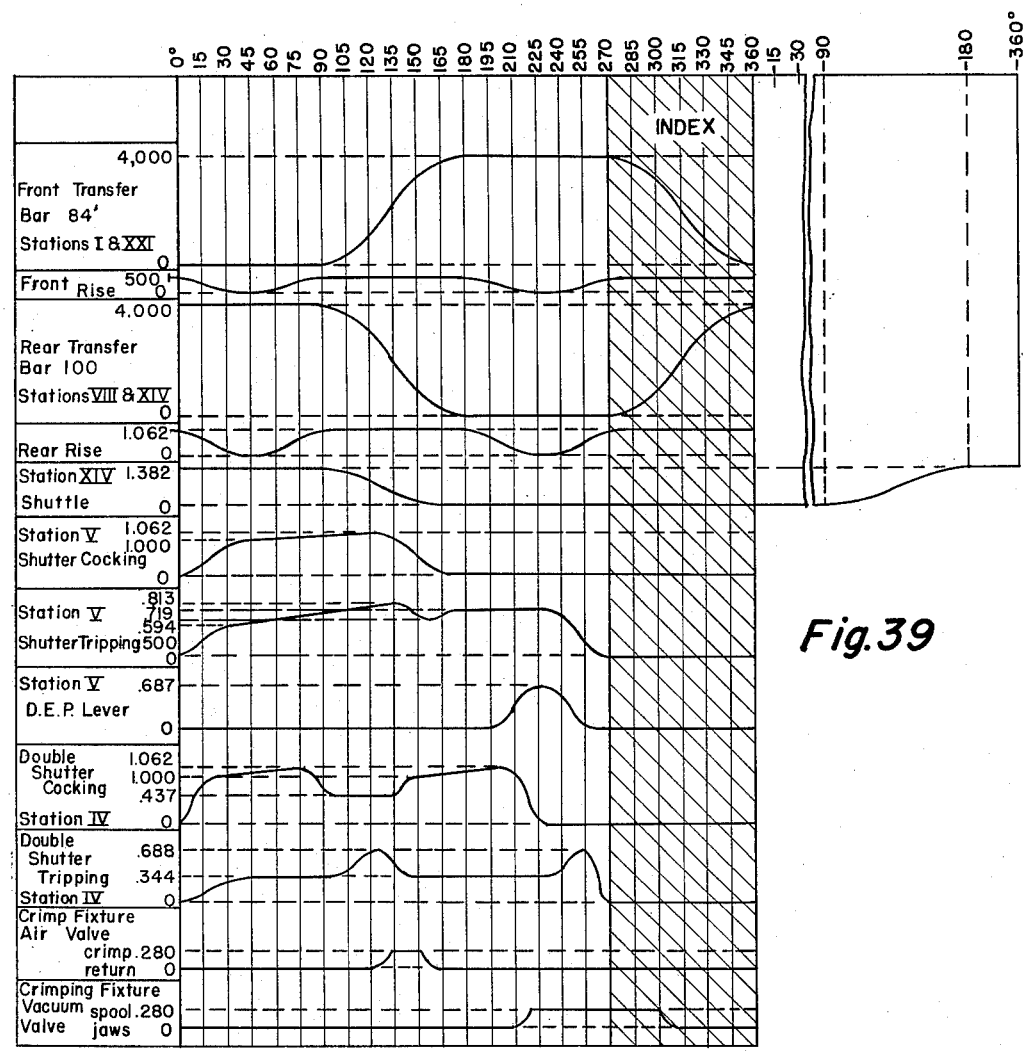

FIG. 39 is a chart showing the operating sequence of certain of the cams on cam shaft 85.

In order to understand the function of the present camera assembling and testing machine, it is necessary to know the construction of the camera and its shutter mechanism which the machine is to assemble and test. Accordingly, a brief description of the camera and its parts involved in the function of this machine will now be described.

Figure 1:
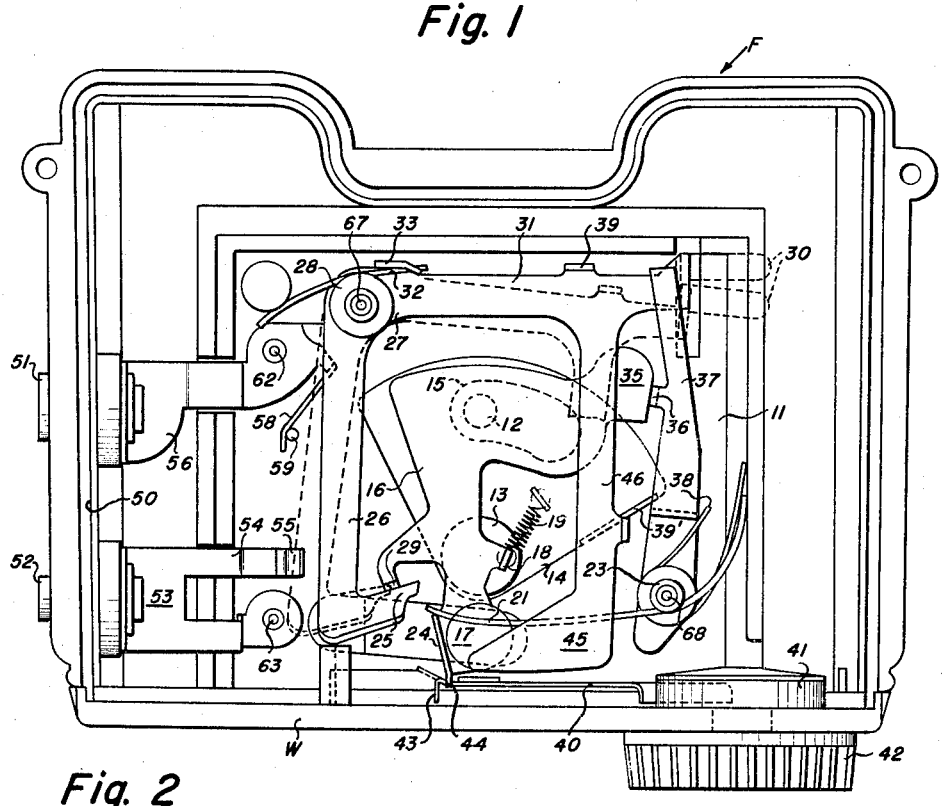
FIG. 1 is an enlarged elevational view of the interior of a camera front containing a shutter which this machine is adapted to test and assemble, and showing the shutter in a cocked condition.
Figure 2:
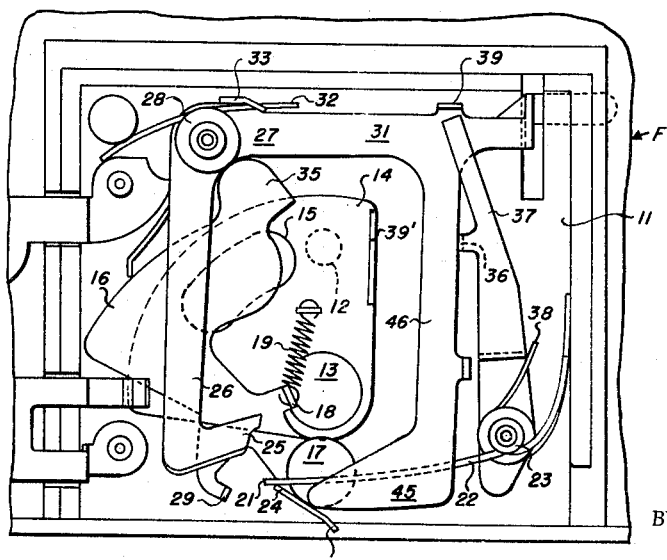
FIG. 2 is a partial view corresponding to FIG. 1, but showing the shutter in a released condition.

In FIGS. 1–3 the camera front F is shown looking at it from the inside. In FIG. 3 the camera front is shown substantially in full size, while in FIG. 1 it is shown much enlarged to show the shutter mechanism which is assembled therein by hand before the camera front is fed to the assembling and testing machine constituting the present invention. The shutter of this camera forms no part of the present invention, it being disclosed in pending U.S. patent application Serial No. 553,632, filed December 16, 1955, in the names of E. S. Marvin and R. F. O'Brien, but since the testing function of the machine constituting the present invention involves operating this shutter and testing its mechanical and electrical characteristics, a brief description of the shutter construction and operation is deemed to be in order.

The shutter of this camera comprises a shutter blade 14 which is rockably mounted about a pivot 13 on the front wall 11 of the camera front F and having a kidney-shaped opening 15 which is adapted to be passed across an exposure aperture 12 in the front wall to make an exposure. A shutter or cover blind 16 overlies blade 14 and the opening 15 thereof, and is rockably mounted about pivot 17 on the front wall 11. The cover blind 16 is connected to the shutter blade 14 by a coil spring 19 so that as blind 16 is rocked counterclockwise from a cocked position shown in FIG. 1, the lug 18 thereon to which spring 19 is connected is moved in an arc about pivot 17 as a center. This movement tensions spring 19 and when the lug 18 passes dead center, the spring will quickly rock the shutter blade 14 from the position shown in FIG. 1 to that shown in FIG. 2, with the cover blind uncovering the exposure aperture 12, to make an exposure. The driving spring for the shutter comprises arm 21 of spring 22 wrapped about vertical stud 23 extending upwardly from the front wall 11 and engaging a turned-up ear 24 on the cover blind. The shutter is latched in a cocked condition by a lug 25 on the arm 26 of bell crank 27 pivoted on vertical stud 28 which snaps behind an ear 29 on the cover blind. The shutter is released by pressing down on a trigger 30 which extends to the outside of the camera front and which trigger is formed on the end of arm 31 of the bell crank 27. When the trigger is moved down to the dotted line position in FIG. 1, the lug 25 is moved from in front of the ear 29 on the cover blind and then the spring arm 21 snaps the cover blind 16 counterclockwise to make an exposure. After an exposure, the cover blind and shutter blade remain in the position shown in FIG. 2 and as soon as the trigger is released, the bell crank 27 returns to its normal latching position under the action of spring 32 engaging lug 33 struck up therefrom.

The shutter is equipped with a double exposure prevention device, hereinafter referred to as a d.e.p. mechanism, which prevents a second actuation of the shutter trigger until the shutter has been cocked and the film wound. Just as soon as the shutter is tripped and the cover blind 16 is released and starts to move counterclockwise, the nose portion 35 thereon moves from in front of lug 36 on locking lever 37 and this lever is free to move counterclockwise about stud 23 under the action of spring 38 to the position shown in FIG. 2. In this position the end of locking lever 37 comes beneath a turned-over lug 39 on the arm 31 of bell crank 27 to positively prevent a second actuation of the trigger. When the shutter is reset, the nose portion 35 on the cover blind re-engages lug 36 on locking lever 37 and moves it from latching relation with the trigger. Before this happens, the nose portion of the cover blind engages a flange 39' on the shutter blade and moves it clockwise toward a cocked position where it is held by coil spring 19. In this camera the shutter is set when the film is wound and to this end, an oscillatable shuttle 40 mounted on a bottom wall W of the camera, see FIG. 1, is oscillated by a cam 41 on the film winding knob 42. The end 43 of this shuttle engages an extension 44 on the ear 24 of the cover blind and moves it to the left from the position shown in FIG. 2 to that shown in FIG. 1, thus cocking the shutter when the film is advanced. To be sure the end of the shuttle 40 is moved out of the way of extension 44 on the cover blind to permit an exposure, a foot 45 is formed on the end of arm 46 of the bell crank 27 which will engage and depress the shuttle from the path of the extension just before the cover blind is released. So far as the operation of the camera assembling and testing machine constituting the present invention is concerned, it need only be remembered that the extension 44 on the cover blind 16 must be engaged and moved to the left to the FIG. 1 position to cock the shutter.

This shutter has a built-in flash synchronizer mechanism which is adapted for use with one or the other of two different types of flash holders. Since the assembling and testing machine of the present invention is concerned with making certain electrical tests on this flash circuit, the arrangement of the parts of this circuit and this operation need be understood to some extent.

Extending from the vertical side wall 50 of the camera are two hollow terminals 51 and 52 into which contact pins on a flash holder containing a power source are inserted to mount the flash holder on the camera and electrically connect the same to a flash switch in the shutter as is well known. Terminal 52 is connected to contact strap 53 which terminates in a spring finger 54 turned up on the end as shown at 55 so that arm 26 of bell crank 27 will slide into contact and under it just before it reaches its shutter releasing position, see dotted line position in FIG. 1. This grounds the shutter mechanism, including shutter blade 14, to one side of the flash holder circuit. The other terminal 51 is connected to contact strap 56 which terminates in a spring finger 58 lying against insulated pin 59 in a position to be engaged by the shutter blade 14 when it moves to make an exposure and thereby completes the flash lamp circuit to fire the lamp in the flash holder, not shown. In certain models of these cameras a flash holder is built into the camera rather than being detachably connected thereto. For this purpose two additional terminal buttons 60 and 61 are mounted on the front wall of the camera, see FIG. 4, and these buttons are staked or riveted to connect straps 56 and 53, respectively, as shown at 62 and 63 in FIG. 1.

After the shutter mechanism is mounted in the camera front F, as shown in FIG. 1, it is enclosed by a cover plate 65 having an exposure aperture 66 formed therein. In order to mount this cover plate in position, the tops of each of studs 23 and 28 of the shutter mechanism, FIG. 1, are machined to provide rivet posts 68 and 67, respetcively. The cover plate is provided with a pair of diagonally spaced holes which will engage these posts when the plate is dropped thereon, see FIG. 3. This is a hand operation but when the camera fronts are then fed into the assembling machine to be described, one operation of the machine is to turn over these rivets to stake the cover plates in place.

The camera back B is shown in FIG. 5, and it will be seen that its inside edge is complementary in shape to the inside edge of the camera front F so that the two will fit together as shown in FIG. 9. One of the parts, the front, is provided with a recess 70 around its edge, while the other, the back, has a rib 71 around its edge adapted to fit into the recess to form a light-tight joint between the two when they are mounted in face-to-face relation, see FIG. 9. Likewise, both the front F and back B have corresponding tongue portions 73 on their vertical sides which mate when the parts are brought together. The outside edge of each tongue portion 73 is undercut, as shown at 74 in FIG. 9, so that the front and back may be held toegther by a sheet metal clip 75, of the form best shown in FIG. 10, which is snapped over the tongue portions and bent into the undercut portion thereof. The clips 75 are prevented from sliding longitudinally off the tongue portion by virtue of a bowed portion 76 which embraces corresponding apertured enlargements 77 on the tongue portions 73 to which a carrying strap may be attached, and by a turned-in end 78 at the lower end of the clip which engages a corresponding curved portion 79 on the tongue portions 73, see FIGS. 5 and 10A.

The camera back B has a shouldered hole 80 molded in the back wall, see FIG. 6, into which a red plastic window 81, see FIG. 7, is adapted to be fixed by being inserted into the hole and deformed around the shoulder in hole 80' under heat and pressure through the use of suitable heated dies, see FIG. 8. This assembly of the red window 81" into the camera back is carried out on the present camera assembling and testing machine, and before the back B is placed on the front F as will be fully described hereinafter.

As will be described hereinafter, the machine constituting the present invention is designed to take camera fronts F, assembled to the condition shown in FIG. 3, from a feed-in conveyor and place them one at a time on succeeding fixtures or holders carried by an endless chain which is intermittently indexed in an oval path. As the loaded fixtures are indexed around the oval path, they are momentarily stopped at twenty-four stations at certain of which a series of assembling and testing operations are performed upon each camera part. The first operion is to rivet or stake the cover plate 65 in place, then at a succeeding station the shutter is operated twice to break it in. Then at the next station the shutter is operated and several tests are given it to test the flash synchronizer and the double exposure prevention mechanism. If at this time the shutter mechanism fails to pass any of the tests, one or more electrical impulses peculiar to the different tests operate a memory system which will cause that camera front to be rejected from the conveyor at a succeeding station and into a certain one of several reject bins according to the test failed. The camera fronts which pass the several shutter tests then pass onto a succeeding station where the camera backs B are put on the camera fronts. The camera backs B have their red windows automatically assembled at this point just before they are placed on the camera front. Then the combined camera fronts and backs move onto a station where the metal clips are placed over the mating tongues 73, 73 on the two parts and are crimped over the undercut tongues to lock the backs and fronts together. Then the assembled backs and fronts pass through a station where they are tested to see if the clips have been satisfactorily applied. If the connection between a back and front is loose, then the machine is automatically stopped and the defective assembly is removed. The properly assembled camera fronts and backs then move to a position where they are lifted off the conveyor and pass onto a further assembly line, and the empty fixtures move on and return to the first station to pick up another camera front to repeat the cycle.

Referring now to FIG. 11, which shows schematically a plan view of the essential parts of a camera assembling and testing machine constructed according to a preferred form of the present invention, the over-all function of the machine will be described. An endless chain 80 passes around a pair of spaced sprockets or spiders, 81, 81', one of which is intermittently driven by mechanism to be described. This chain carries a plurality, 24 in this instance, of fixtures or holder supports 82 on which fixtures generally indicated at H are mounted to carry the camera parts to be assembled. The drive for the chain is such that the fixture supports 82 are intermittently advanced through twenty-four stations, being stopped for short intervals at each.

Camera fronts F assembled to the condition shown in FIG. 3 are fed to station I by an endless conveyor 83' driven by a motor $M_f$, see FIG. 22, in the direction as shown by the arrow. As the chain 80 stops with an empty fixture at station I, a gripper 84 on the end of a reciprocating arm 84' picks up a camera front F from the conveyor 83' and places it on the fixture at station I. This gripper 84 is lifted and reciprocated at the proper time by cams on the cam shaft 85 which are driven in timed relation with the chain 80, as will be hereinafter fully described. After a camera front is placed in the fixture H at station I and clamped thereon, the chain advances this fixture to station II on its next advance, while advancing another fixture into station I to receive a camera front. At station II a pair of hammers 86 carried by arms 87 are operated by cams 88 on cam shaft 85 to peen over rivets 67 and 68 and rivet the cover plate 65 to the camera front.

At stations I and II the fixture H is positioned to hold the camera front horizontally with the inside, see FIG. 3, facing upwardly. In passing to station IV, from station III where no operation is performed, the fixture H is pivoted to a vertical position by a roller 89 on the outside edge of the fixture engaging a stationary inclined cam surface 90 which continues on into a straight cam surface 91 which holds the fixture in a vertical position while it is passing through stations IV, V and VI. The reason for this is to position the camera front F carried by the fixture in a vertical position, or a position in which it is normally used, so that the shutter trigger 30 can be operated and the shutter tested. When the fixture in question reaches station IV, a cam-operated shutter tripping and setting mechanism, indicated generally at 92, operates the shutter mechanism a couple of times to break it in.

When the fixture reaches station V, the camera shutter is tested for flash synchronization, the flash circuit of the shutter is tested for electrical energy, the open time of the shutter is tested, and the double exposure prevention mechanism is tested. To this end the shutter is moved between a light source, not shown in FIG. 1, and a photocell pickup 93, and a pair of electrical contacts 94 are moved into engagement with contact buttons 51 and 52 on the side of the camera front by a linkage operated by a cam on cam shaft 85 as by mechanism indicated generally at 95. The shutter trigger 30 is tripped by a cam-operated mechanism similar to that used at station IV and here indicated generally at 96. When the shutter opens, the photocell receives a flash of light of duration commensurate with the opening characteristics of the shutter and feeds a pulse into a synchronizer tester to be later described. If the synchronizer does not meet certain limits, a pulse is fed into a memory system, indicated generally at 97, and described hereinafter, which is intermittently driven in timed relation with the chain so as to operate the reject mechanism for any camera shutter not meeting the certain tests. Likewise, the contacts 94 feed into a flash energy tester, later described, which will send a pulse into the memory system should the flash circuit of the shutter have too much resistance or be shorted. While the camera front is still at station V, the d.e.p. mechanism will be tested by the shutter tripping mechanism attempting to operate the shutter trigger a second time without first setting it by operation of extension 44 as would be normally done by operating the film wind mechanism. If the shutter trigger can be operated a second time, showing the d.e.p. mechanism is faulty, a signal is sent into the memory system 97 indicating the fault. Also at station V the equivalent open time of the shutter is tested.

As the camera front moves from station VI, which is an extra station in the present setup and nothing happens, to station VII, the roller 89 on the fixture engages another stationary cam 98 which pivots the fixture back down to a horizontal position, in which position it remains for the rest of its journey. Nothing happens at station VII. At station VIII any camera front whose shutter did not pass all the tests at station V is picked off its fixture H by gripper 99 on the end of a reciprocating arm 100 and dropped into an inclined reject chute 101. The gripper 99 operates in response to the memory system 97. As shown in FIG. 11A, the reject chute 101 includes a plurality of pivoted trap doors 102 which can be opened to drop the rejected camera front into one of a plurality of different reject bins in accordance with the test which it failed. These trap doors are operated by linkages including rotary solenoids 103 whose energizing circuits are selectively completed by the memory system 97.

The fixtures H with or without camera fronts, as the case may be, are then fed to station XIV where camera backs B have their red window 81'' assembled thereon and are then dropped onto camera fronts F in the fixtures H. The camera backs B, without red windows thereon, are moved by a conveyor 104 in the direction of the arrow by a motor $M_b$, see FIG. 22, to a position where a gripper 105, carried by reciprocating arm 100, picks them up one at a time and places them on one or the other of two heated dies 106 and 106' which are on a reciprocating table or shuttle 107 and successively pick up red windows 81'' from opposite ones of two chutes 108 and 108'. The gripper 105 in coming down to pick up a back from die 106 or 106' carries a companion die which presses down on the window and deforms it about the shoulder in the aperture 80' of the camera back and thus mounts the window in the back as shown in FIG. 8. A second gripper 109 connected in tandem with gripper 105 on reciprocating arm 100 then picks up the assembled back from die 106 or 106' as the gripper 105 moves out to pick up another back from the conveyor 104 and upon the return stroke of the arm places the assembled back on the camera front which is at station XIV. Shuttle 107 carrying dies 106 and 106' is reciprocated by a cam-operated linkage driven from the main cam shaft 85 as indicated generally at 110.

The assembled camera front and back is then moved to station XVIII where two metal clips 75, see FIG. 10, are picked up from chutes and placed on the mating tongues 73, 73 at each edge of the two camera parts, see FIG. 9, by mechanism indicated generally at 111, said clips being crimped to hold the camera front and camera backs together as shown in FIG. 11. This clip applying mechanism is driven from main cam shaft 85 by mechanism indicated generally at 112 in FIG. 1, but which will be described in detail hereinafter. The completely assembled camera front and camera back is then indexed to station XIX where it is tested, by mechanism indicated generally at 113, to see if the parts are properly joined. If they are not, a switch is operated to stop the machine and the operator removes the piece and restarts it by again pressing the start button $PB_1$, see FIG. 22. Any completed assembly reaching station XXI is then picked off its fixture by gripper 114 on the end of reciprocating arm 84' and dropped into a takeaway conveyor or chute 115 for further assembly. The empty fixture then indexes back to station I where it picks up another camera front and repeats the cycle.

We will now describe in detail the different parts of the machine. Looking first at FIGS. 12 and 13, the manner in which the drive chain for the fixtures is mounted and the drive therefore and the cam shaft will be described. The machine comprises a plurality of vertical legs 117 resting on the floor and which support bed plates 118 on which the fixture conveying mechanism is supported about waist high. Supported by the bed plates 118 is a channel-shaped web 119 which is oval in plan view, corresponding to FIG. 1. Carried by the upper flanges 120 of web 119 is a second horizontal bed plate 121 on which the supports 122 for the bearings of cam shaft 85, as well as the other operating mechanism, are mounted. Fastened to the web portion of channel 119 by bolts 123 are track members 124 and 125. These track members, in combination with guide surfaces 126 and 127 rotatably confine ball bearing rollers 128, 129 and 130 mounted on a carriage 131 to which an endless roller chain 80 is fixed by brackets 132. The roller chain is engaged and driven by a double row of teeth 133 on the arms 134 of horizontally disposed sprockets or spiders 81 and 81' journalled in bearings 134' supported by plates 118 and 121. Only one of the sprockets is driven, the left-hand one 81' looking at FIG. 13, while the other is driven by the chain and acts as a guide therefor.

The left-hand sprocket 81' is intermittently driven by any suitable heavy-duty intermittent drive mechanism, and in FIG. 13 we have shown a commercially available unit which may comprise a combined three-horsepower motor and variable drive unit $M_D$ connected by a conventional solenoid-operated magnetic clutch and brake unit CB to a commercially available speed reducer I. It should be noted at this point that the view shown in FIG. 13 is just reversed to that shown in FIG. 11, or looking at the machine from the side where driven sprocket 81' is at the left. The output shaft 135 of the speed reducer I is connected through a commercially available indexing unit 136 to vertical shaft 137 to drive the sprocket 81' intermittently. A take-off drive from shaft 135 including sprockets 138 connected by a chain 139 engaged by a take-up idler 140 drives horizontal shaft 116 and sprockets 141 engaged by chain 142 which in turn drives the cam shaft 85 continuously and in synchronism with the sprockets 81, 81' and the indexing of the chain 80.

As is well known, a conventional magnetic clutch and brake unit of the type mentioned includes solenoids which must be connected to a D.C. power source. In the wiring diagram of FIG. 22 we have shown a full wave selenium rectifier $S_R$ connected to one secondary of a power transformer $T_1$ and the solenoids $C_S$ and $B_S$ for operating the clutch and brake, respectively, connected in parallel in the output of the rectifier and controlled by normally open and normally closed contacts $cr_2$ of the relay $CR_2$ in the control circuit so that when the clutch solenoid is energized to actuate the clutch, the brake solenoid is de-energized and vice versa. The control circuit for the chain drive is shown as comprising feed-in and return leads $L_1$ and $L_2$, respectively, which are connected to another secondary on the transformer $T_1$. The relay $CR_2$ is connected in branch 6 of the control circuit and when energized will cause the magnetic clutch to be engaged to drive chain 80 but when de-energized will cause the clutch to disengage and the brake to be applied. Connected in branch 6 in series with relay $CR_2$ are a pair of normally open switches $LS_2$ and $LS_3$ which are located adjacent the camera front conveyor 83' and the camera back conveyor 104, respectively, so as to be engaged and closed by these camera parts when said parts are in a position at station I and XIV to be engaged by grippers 84 and 105 in proper orientation at the end of an indexing step of the chain. These two switches $LS_2$ and $LS_3$ are shunted by a branch C including program switch $P_{12}$ which keeps the chain drive in operation during an indexing step of the machine and during which time the camera parts would be fed into loading position by their conveyors and switches $LS_2$ and $LS_3$ would be open.

Program switch $P_{12}$ is one of several in the control circuits, as will be set forth hereinafter, which are closed during specified intervals by one of a group of program cams, not shown, but mounted on a shaft 365 contained in program cam box P driven by a chain and sprocket drive 366 from cam shaft 85 so that their operation is synchronized with indexing movements of the machine. The program switch operating sequence diagram is shown in FIG. 38.

The primaries of transformer $T_1$ are connected into a 230 v., 3-phase power supply including main switches $S_M$. Likewise, the drive motors $M_D$, $M_s$, $M_f$ and $M_b$ are connected directly into this power source. These motors will start only when the "motor start" switch in branch 1 of the control circuit is manually closed since this puts power onto the conventional 3 pole magnetic starter M which has contacts $m$ in each of the motor circuits. The motor start switch is shunted by branch 2 containing switches $V_s-1$ and $P_s-1$ which will close and remain closed only when there is sufficient vacuum and pressure, respectively, on the suction and air lines of the machine, as will be set forth below. The "motor stop" switch is shunted by a program switch $P_{20}$ which prevents the machine from being stopped during an indexing cycle.

Referring now to FIGS. 12, 14–16, the fixtures H for holding the camera fronts F onto the chain 80 will be described. Fixed to the carriage 131 at twenty-four points spaced around the chain 80 in correspondence with the indexing movement thereof are fixture supporting brackets 82 which are generally L-shaped, see FIG. 12. The long face 146 of these brackets is bolted, or otherwise suitably fastened, to the vertical face of the carriage 131 and a projection 147 thereon rests on the horizontal edge of the carriage. The short face 148 of the bracket 82 extends horizontally and has two spaced upstanding ears 149 through which pins 150 on the fixture extend to pivotally mount the fixture thereon.

The camera fixture, designated generally as H in FIG. 16, comprises an L-shaped support 151 from the corner of which pivot pins 150 extend to pivotally mount the fixture on the brackets 82. The arm 152 of support 151 includes a plurality of supporting studs 153 which engage the outside face of the front wall 11 of the camera front F when the same is placed open side up thereon, as indicated in dotted lines in FIG. 15, and two of which are so disposed as to back up the rivets 67 and 68 for the riveting operation, as will be described hereinafter. Opposite corners of the arm 152 have two vertical posts 155 fixed thereto and these posts terminate in locating pins 156 which are adapted to engage the holes in enlargements 77 on the tongue portions 73 of the camera front when it is dropped vertically downward into the fixture, see FIG. 15. Thus the supporting studs 153 in combination with the tops of posts 155 engage the camera front to support it in a fixed horizontal plane while the two locating pins 156 prevent the camera front from turning in this plane. The arm 152 of the fixture includes a pair of electrical contacts 157 which are insulated from each other and the metal fixture and are disposed to be engaged by contact buttons 60 and 61 on the front wall of the camera front, see FIG. 4, when the camera front is placed on the fixture. Each of these contacts 157 terminate in vertically upstanding portions 158 which will lie adjacent the electrical contacts 51 and 52 extending out from the side wall of the camera front F, see FIG. 3, so that both sets of contacts on the camera front can be connected with the shutter testing circuit by a single pair of testing contacts, as will be described hereinafter.

For holding the camera front F in the fixture H a clamping jaw 160 is pivoted at 161 to the vertical arm 162 of the fixture support 151. This jaw is normally moved to the raised or open position shown in FIG. 16 by a pair of tension springs 163 connected at one end to lugs 164 extending from the rear of the jaw and fixed at the other end to pins 165 on the support 151. In this open position a camera front F can be loaded into or removed from the fixture. After a camera front F is loaded into the fixture, the clamping jaw 160 is closed by merely pressing downwardly on the front end thereof. It is held in a closed position by a releasable latch mechanism including a U-shaped bar 166 pivoted at its opposite ends by pins 167 to the upstanding arms 162 of support 151. This latching bar is normally spring pressed to its latching position, see FIG. 15, by a pair of tension springs 168 fixed at one end to pins 169 extending rearwardly from the bar and pins on the support 151 which cannot be seen because they line up with pins 165. Pins 170 on latching bar 166 extend into engagement with cam slots or recesses 171 formed in the inside faces of arms on the clamping jaw 160, and when the pins 170 on the latching bar snap into the offset end 172 of these recesses, as shown in FIG. 15, the jaw is latched in clamping position by the latching bar. The pins 170 are cammed to their latching position when the jaw is pressed down to its holding position. To release the jaw 160, all that is necessary is to press the latching bar 166 forwardly, or to the right, looking at FIGS. 15 and 16, to the position shown in FIG. 16. Just as soon as the pins 170 on the latching bar are removed from the offset 172 in the cam-shaped recesses of the jaw, the springs 163 are free to snap the jaws to an open position. Pins 173 on the latching bar engage notches 174 on the top of the jaw to limit the amount the jaws can open. The latching bar 166 is provided with a rather long actuating arm 175 which extends vertically upward from the center of the fixture to permit ready release of the latch by sensing portions of the over-all machine as will be readily apparent from the following description. So far as the over-all function of the machine is concerned, all that is necessary to remember is that when the clamping jaw 160 is pressed down from the position shown in FIG. 16 to that shown in FIG. 15, the latching bar 166 and actuating arm 175 therefor move to the latching position shown in FIG. 15 wherein arm 175 extends vertically upward or slightly to the left of the vertical as shown in FIG. 15. Then to release the clamping jaw all that is necessary is to press the actuating arm 175 forward, indicated by arrow in FIG. 15, whereupon the clamping jaw will be unlatched and the parts will move to the position shown in FIG. 16, in which actuating arm 175 is inclined to the right of the vertical as viewed in FIG. 16. Fixed to the front edge of arm 152 of support 151 is a roller 89 the purpose of which is to engage cam surfaces to tip the whole fixture about its pivot pins 150 as will be described hereinafter.

Looking now at FIGS. 11 and 17, we will describe the mechanism for loading the camera fronts F onto the fixtures at station I and removing the assembled camera fronts and backs from the fixtures at station XXI. As pointed out above, the camera fronts F are fed to station I on a continuously moving conveyor belt 83' where they are held against a suitable stop, indicated at 145, to be picked up by gripper 84 and loaded onto a fixture H at station I. The gripper 84 is first moved vertically from the position shown in FIG. 17 where it picks a camera front F from conveyor 83', then horizontally until the camera front is within an open fixture, and then vertically downward to a position wherein it places a camera front in the fixture H at station I and then closes the clamping jaw 160 of the fixture. The desired horizontal reciprocation of the gripper 84 is accomplished by reciprocally mounting bar 84' on ball bearing supports 180 carried by guide members 181 which are slidably mounted on vertical posts 182. Up-and-down movement of the supports 180 and the reciprocating bar 84' carried thereby is accomplished by a pair of cams 183 and 183' which engage follower rollers 184 connected to the guide members 181. The cam 183 is driven by a chain 185 while cam 183' is driven by a chain 186. Chain 186 is driven by a sprocket 187 fixed to cam shaft 85, while chain 185 is driven by a sprocket 188 fixed to a gear 189 engaging a like gear 190 fixed to sprocket 187. By virtue of these chain drives, both cams 183 and 183' are driven in synchronism with the cam shaft 85.

The reciprocating arm 84' is reciprocated by a cam 191 fixed to cam shaft 85 which is engaged by a roller 192 carried on the end of pivoted arm 193. This roller in turn engages a follower 194 fixed to reciprocating bar 84'. A tension spring 195 fixed at one end to a pin 196 on bar 84' and at the other end to a pin 197 on a fixed part of the support 180 tends to move the bar 84' to the right, looking at FIG. 17, and hold the follower 194 against roller 192. The cams 183, 183' and 191 are so designed and synchronized that the gripper 84 carried on the end of bar 84' moves through the desired path described to load a camera front F from the conveyor 83' onto a fixture H as it reaches station I and with sufficient dwell at each end of its stroke for the gripper 84 to close and open to grasp and release a camera front.

Looking at FIG. 18, the gripper 84 will be described. Carried by a vertical plate 198 fixed to the end of bar 84' is a cross bar 199 to the opposite ends of which a pair of bell cranks 200 are pivoted at points 201. These arms are normally pivoted to a gripping position by tension spring 202 wherein channel-shaped grippers 203 on the end of arms 204 positively grasp the tongue portions 73 at each edge of a camera front F. The ends of arms 205 of the bell cranks 200 lie in the path of a plunger 206 of a pneumatic cylinder 207. When air is admitted to cylinder 207 through air line 177, the plunger 206 is forced downwardly to open the grippers 203, whereas when air is cut off and exhausted from the cylinder 207, then the spring 202 is free to close the grippers. The valve, not shown, in air line 177 for the pneumatic cylinder 207 is a conventional solenoid-operated, normally closed, spring-return, three-way valve, the operating solenoid for which is shown at $S_f$ in branch 9 of the wiring diagram in FIG. 22. Energization of this solenoid is controlled by a program switch $P_{14}$ which is controlled by a program cam in box P so that the grippers 203 will be allowed to close when the gripper is in a position to pick up a camera front F from the conveyor 83', remain closed while the reciprocating bar 84' is being moved to a position where it loads a camera front onto a fixture H at station I and then open to leave the camera front in the fixture and stay open until it is returned to a position to pick up another camera front from the conveyor. A yoke-shaped presser foot 209 is connected to the plunger 206 by screws 209' to close the clamping jaw 160 of the fixture H after a camera front F has been properly inserted thereinto. It should be noted that this presser foot 209 is so designed as to be pushed downwardly to close clamping jaw 160 just before the grippers 203 release the camera front F.

Since station XXI, where a completed camera is removed from its fixture H, is directly opposite station I, the gripper 114 for lifting the camera from its fixture H and depositing it on a takeaway conveyor 115, see FIG. 11, can be mounted on the end of reciprocating bar 84' as shown in FIG. 17. The gripper mechanism 114 is substantially the same in construction as gripper 84 and, hence, need not be separately described. It need only be said that gripper 114 is in a position to lift a completed camera from its fixture at the same time gripper 84 is picking up a camera front F from conveyor 83'. Then after bar 84' has moved gripper 84 to a position to load its camera front F onto a fixture, gripper 114 is in a position to deposit the camera it is holding onto takeaway conveyor 115. It necessarily follows that the gripper jaws 203' on grippers 114 must be twice as wide as gripper jaws 203 on gripper 84 since they must embrace two mating tongue portions 73 on the camera front and camera back assemblies. Another difference between the two gripper constructions is that gripper 114 need not have a presser foot 209 to close the clamping jaw 160 of the fixture, but must have a cam-shaped projection 700 to engage latching arm 175 of the fixture and open it before the bar 84' moves to lift the completed camera from the fixture, as will be described more fully hereinafter.

After a camera front F is placed on a fixture H at station I, the fixture is then indexed by the chain to station II where the cover plate 65 is riveted in place. As shown in FIG. 12, the two rivets 67 and 68 are moved under peening rods 210, the rivet engaging ends 211 of which extend through holes 212 in the clamping jaw 160 of the fixture H. The peening rods 210 are slidably mounted in bushings 213 carried by support arm 214. Each peening rod 210 has an enlarged head 215 between which, and a collar 216 fixed to the rod, the apertured end of one of two bars 217, pivoted at 218 is situated. Roller followers 219 on the end of each bar 217 engage a cam 220 fixed to cam shaft 85 to lift the peening rods 210 enough to allow the fixture to move under them and then they allow the peening rods to descend onto the rivets 67 and 68. During this time a pair of like cams 221 on cam shaft 85, only one being shown in FIG. 12 because they are in line, have lifted hammers 86 through engagement of rollers 222 on the ends of arms 87, see dotted line position of rollers 222 and arm 87 in FIG. 12. When the peening rods 210 are in position, the rollers 222 come to the sharp dropoff 223 in cams 221 and the hammers 86 drop down onto the peening rods 210 with a free fall to set the rivets. Before the next indexing of the chain 80 and fixtures H thereon, the cams 220 engage rollers 219 and lift the peening rods 210 out of the holes 212 in the clamping jaw 160 of the fixture.

Nothing happens as a fixture H moves into station III, but when it moves to station IV, the shutter mechanism in the camera front F is operated a couple of times to break it in. In order to operate the shutter trigger 30, the camera front F must be swung from a horizontal to a vertical position. This is done by the engagement of roller 89 on the front edge of the fixture moving along a stationary inclined cam surface 90 and into engagement with the straight cam portion 91, which causes the fixture H to swing upwardly through 90° about its pivot pins 150 to a vertical position shown in FIGS. 11 and 19. In this position of the fixture the arm 162 thereof comes against stop pins 225 on support 82, see FIGS. 15 and 19. After a camera front F reaches station IV, its trigger and setting mechanism is operated twice by a tripping and setting mechanism, indicated at 92 in FIG. 11, for break-in purposes. Since this shutter tripping and setting mechanism is substantially the same as that used at station V to actuate the shutter for test purposes, it will not be described in detail at this point but will be described fully in connection with the operation carried out at station V.

Looking at FIGS. 11 and 19, as the camera front F is indexed into station V, the shutter trigger 30 of the camera front moves under shutter operating pin 226 which is reciprocally mounted in fixed guides 227. The first thing that happens is the shutter is set by pressing extension 44 on the shutter cocking mechanism, see FIG. 2, upwardly, looking at FIG. 21, or away from the viewer when looking at FIG. 19. To this end, a bell crank 228 pivoted at 229 is swung in a counterclockwise direction, looking at FIG. 19, when a lobe of cam 230 on cam shaft 85 reaches roller 231 on arm 232 of the bell crank. This causes the other arm 233, connected to slide 235 by a link 236 to push the slide 235 in guideway 236 toward the camera front F against the action of tension spring 237 connected between a pin 238 on the slide and a pin on the stationary support 239 on which the bell crank is pivoted. As the slide 235 moves toward the camera front F, a finger 240 on the end of a jointed lever 241 pivoted at 242 to the slide is moved behind the extension 44 of the shutter setting member.

After the finger 240 reaches this position, a stop lug 243 on the jointed lever engages a fixed stop button 244 carried by an adjustable block 245 adjacent the slide. When this occurs, further forward movement of the slide causes the jointed lever to swing counterclockwise, looking at FIG. 21, about its pivot 242 whereupon the end of finger 240 engages and moves extension 44 to set the shutter. The joint 247 in lever 241 is constrained against breaking by a spring 248, but should the setting mechanism of the shutter be prevented from working for some reason or other, the joint will break so that a damaging force will not be applied to the shutter setting mechanism. Just as soon as the shutter has been set, the roller 231 rides off the lobe of cam 230 and the spring 237 retracts the finger 240 from the camera front F.

At this time the lobe on cam 250 fixed to the cam shaft 85 engages and raises roller 251 on the arm 252 of a bell crank pivoted at 253 on the supporting post 239 which is normally pivoted in a counterclockwise direction, see FIG. 19, by a tension spring 254. This moves the arm 255 clockwise so that the yoke end 256 thereof will engage collar 257 fixed to the trigger actuating rod 226 to depress the same and actuate the shutter. Arm 255 is provided with a spring-loaded joint 259 which will break should, for some reason, the shutter trigger 30 offer abnormal resistance to its operation. When the camera front F moves into station V, it comes between a light source 260 and a light-sensitive cell 93, each enclosed by suitable housings, as shown in FIG. 19, so that when the camera shutter opens, light from source 260 will strike cell 93 whose electrical output will give an indication of the time the shutter first opens and passes a measurable amount of light and also the time interval during which the shutter is open. As will be described hereinafter, this information is used to test the shutter to see if its time interval of exposure is within tolerable high and low limits, and also to check whether the synchronization time between the closing of the flash switch in the shutter and the opening time of the shutter are within tolerable high and low limits.

Immediately after the shutter has been actuated for test purposes the double exposure prevention mechanism is tested by trying to again depress the shutter trigger 30 without first setting the shutter. This is accomplished when roller 262 carried on one end of a lever 263 pivoted at 253 and tensioned to swing clockwise about pivot 253 by tension spring 264 drops onto a flat portion W of a cam 265 on cam shaft 85. This allows the spring 264 to move the end 267 of lever 263 down against the top of trigger actuating rod 226 in an attempt to trip the shutter. If the d.e.p. mechanism is working properly, the shutter trigger is locked against movement and spring 264 is not strong enough to damage the shutter mechanism. However, if the d.e.p. mechanism is not operating properly, the shutter trigger can be depressed by spring actuated lever 263 and end 267 will move down sufficiently to permit a block portion 268 thereon to engage and depress the operating button 269 of a quick acting snap switch 270 to close the same. As will be described hereinafter, the closing of switch 270 will put a pulse into a memory system which will cause the camera front F being tested to be rejected from its fixture and into an appropriate reject bin in chute 101.

Also at station V the camera shutter is tested for proper synchronization of the closing of its flash switch in relation to the opening of the shutter and to determine if enough sustained electrical energy is being passed through the flash circuit to fire a flash lamp. This flash contact energy factor is effected primarily by excessive "bounce" in the flash contacts although the electrical resistance in the circuit has some bearing on it, and if the flash circuit of the shutter does not pass a sufficient amount of energy in a given time, then it must be rejected. In order to make this test, a source of electrical potential comparable to that carried by the flash holder to be used on the camera must be connected into the flash circuit, this may be anywhere from 3 v. D.C. to approximately 22½ v. depending upon whether the flash holder is to contain two small batteries or a B-C (battery-capacitor) power source having a 22½ v. hearing aid battery, as is well known in the art.

To this end, a pair of electrical contacts 272 fixed to one arm 273 of a bell crank 274 pivoted at 275 is connected to a source of potential 276 equivalent to that to be used in a flash holder by two flexible leads 277. The bell crank is adapted to be swung between an operative position shown in FIGS. 20 and 21 where the contacts 272 are moved into engagement with contact straps 158 on the fixture H and thus connect the source of potential into the flash circuit of the shutter through contact buttons 51 and 52 or 61 and 60, and an inoperative position, not shown, where the contacts 272 are moved out of the path of the fixtures to allow the fixtures to index past this station. To this end, the other arm 278 of the bell crank has a rod 279 connected thereto by a ball and socket connection 280. The other end of this rod 279 is connected by a ball and socket connection 281 to the arm 282 of a lever 283 pivoted at 284 to the support 239. The other arm 285 of lever 283 carries a roller 286 which is spring pressed against a cam 287 fixed to cam shaft 85 by a tension spring 289 connected between arm 273 of the bell crank and the stationary support for stop member 245. Accordingly, when the lobe 290' on cam 287 moves into engagement with roller 286, the bell crank 274 is pivoted counterclockwise, looking at FIG. 21, to move the contacts 272 thereon out of the path of movement of the fixtures H to allow them to index beyond station V. This occurs just before indexing of the chain 80 takes place, and just as soon as a successive fixture H is moved into position in station V, the roller 286 drops off the lobe of cam 287 to allow the contacts 272 to move into engagement with the contacts on the camera front in that fixture. FIG. 39 shows the operating sequence of the different cams mounted on cam shaft 85 for setting and tripping the shutter twice at station IV for break-in purposes, and for setting and tripping the shutter and testing the d.e.p. mechanism at station V.

One of the tests given the camera shutter at station V is the time interval during which the shutter is open, and if this shutter open time is above or below tolerable limits, the shutter should be rejected. In the present instance this is done by converting the open time to an electrical pulse through the use of a photocell 93 which persists until the shutter closes and timing the duration of the pulse electronically by the combined use of a frequency output oscillator gated by the starting impulse and an electronic counter, see FIG. 22. Since the specific form of an electronic circuit suitable for this purpose per se forms no part of the present invention and is well known, it is sufficient for disclosure of the present invention to say that the pulse from the photocell 93 is fed into a photoelectric timing device 290 over lead 291. If the time the shutter is open is above a tolerable limit, switch 292 of timing device 290 will close, while if the shutter open time is below limit, the switch 293 of device 290 will be closed.

For determining whether the shutter switch is properly synchronized, the time lapsing between the instant the shutter switch closes and the shutter opens is measured and if this time duration is above or below tolerable limits, the shutter is deemed faulty. To this end the electric pulse from photocell 93 is fed over lead 294 to an electronic flash synchronizer tester designated at 295 where it is timed relative to a pulse sent into the tester over lead 296 as the shutter switch closes. Since different types of electronic circuits are well known for timing the subsequent occurrence of two impulses, all that it is necessary to know about this synchronizer tester 295 so far as the present invention is concerned is that it contains one switch 297 which closes if the "lag" between the closing of the shutter switch and the opening of the shutter is above a certain limit, and a second switch 298 which closes if the "lag" mentioned is below a certain limit.

For measuring flash contact energy, an electric pulse is fed over lead 299 to an electronic device 300 of any known type when the shutter closes and this device measures the energy passed through the flash circuit of the shutter over a prescribed interval and if it is below a prescribed limit, then a switch 301 in device 300 is closed.

Each of the switches 292, 293, 297, 298, 301, as well as the d.e.p. switch 270 are connected in parallel across leads 302 and 303 connected to a 90 v. D.C. source, and each switch controls energization of one of the memory solenoids $S_1$–$S_6$. These solenoids $S_1$–$S_6$ form a part of a memory device which will now be described which controls rejection of camera fronts from their fixtures as they reach station VIII, and in this connection will be referred to as the read-in solenoids of the memory device.

Referring now to FIGS. 23, 24 and 11, the memory device 97 for controlling the rejection of defective camera fronts F from their fixtures at station VIII will be described. Mounted in a housing 303' at the right-hand end of the machine, looking at FIG. 11, is a vertical shaft 304 having a gear 304' fixed thereto which is in mesh with a pinion 305 on an extension of the shaft for drive sprocket 81' driven from the indexing unit 136 through shaft 137, see FIG. 13. The gearing for shaft 304 is such that this shaft indexes 8½° for each indexing movement of the chain 80. Mounted in vertically spaced relation on the shaft 304 to be rotated thereby are a plurality of flanged sleeves 306. Fixed to the top and bottom of the flanges of sleeves 306 in circumferential relation are two groups of six pintle plates 307 having ears extending into apertures 307' in the flanges. These ears carry pintles 308 on which pairs of ears on metal arms 309 are hinged. On the ends of arms 309 there is fixed an arcuate switch actuating portion 310. It will be noticed that alternate ones of the arms 309 are hinged above and below the flanges of sleeves 306, and this is to permit the positioning of twelve arms around the shaft 304.

Fixed to the wall of the housing below each flanged sleeve 306 is platform 311 having a hole 311' through which the shaft extends. At different points circumferentially of the platforms is fixed one of the read-in solenoids $S_1$–$S_6$, the $S_1$ being shown in full lines and $S_2$ in dotted lines, which are of the rotary type and having a cam 312 fixed to its shaft. When read-in solenoid $S_1$ is energized, its shaft is oscillated and cam 312 thereon engages the switch actuating portion 310 of the arm 309 below it and depresses it downwardly to the position shown where it is held by a permanent holding magnet 313. In this lowered position the switch actuating portion 310 is located in a plane so as to engage the roller 314 on the arm of a read-out switch $SW_1$ and close the same when the shaft 304 has indexed three steps. In other words, the read-in solenoid $S_1$ might have been energized by a camera front F at station V whose shutter did not pass the shutter time interval test because it was above limit and this would cause the arm 309 on the memory device to be depressed. Now after this camera front is indexed three times, or from station V to station VIII, the arm 309 which was depressed would have been indexed three times and to a position to engage and close read-out switch $SW_1$. The read-in solenoid $S_2$ would respond to another type of reject at station V and would actuate its read-out switch $SW_2$ when the camera front reached station VIII.

Looking now at FIG. 22, closing of read-out switch $SW_1$ closes the circuit to memory relay $R_1$ which in turn closes relay contacts $r_1$ and $r'_1$. Closing of relay contacts $r_1$ energizes a solenoid Sg in branch B of the machine control circuit which causes the gripper 99 at station VIII to operate and lift the camera front from its fixture and deposit it in reject chute 101, see FIG. 11, as will be described hereinafter. Closing of relay contacts $r'_1$ connects the rotary solenoid 103 associated with this type of reject to a 90 v. D.C. source and causes its corresponding door 102 in the chute 101 to open and place this camera front in a reject bin labelled for this particular defect. After the arms 309 pass the read-out switch, they move across a stationary cam 261 on the platform immediately adjacent the read-out switch which moves them to a reset position where their switch actuating portions 310 are out of the plane of the roller on the read-out switches $SW_1$–$SW_6$ and in which position they are held by another holding magnet 315. On each of the flanged sleeves 306 and associated platform 311 there can be mounted a maximum of four sets of read-in solenoids $S_1$–$S_6$ and read-out switches $SW_1$–$SW_6$ since each set must be spaced apart by only three of arms 309 so that each failure condition of a shutter read in at station V will be read out at station VIII and operate the proper door 102 in the reject chute as well as setting the reject gripper 99 into action. In FIG. 23 we have shown only two sets of read-in solenoids ($S_1$ and $S_2$) and read-out switches ($SW_1$ and $SW_2$), instead of four sets, for sake of clarity. Looking at FIG. 22, it will be noticed that energization of any one of the memory relays $R_1$–$R_6$ will cause the reject gripper 99 to operate since each of their contacts $r_1$–$r_6$ will cause energization of solenoid Sg. However, in order to have a different door 102 in the reject chute 101 operate for the different types of shutter failure requires the use of a number of different read-in solenoids ($S_1$–$S_6$), and read-out switch ($SW_1$–$SW_6$) combinations, along with memory relays $R_1$–$R_6$ with their contacts $r'_1$–$r'_6$ in the rotary solenoid control circuit. A normally open program switch P–16 is connected in branch B in series with relay contacts $r_1$–$r_6$ so that the solenoid Sg can be energized only at the time it is in the proper position to pick a camera front from its fixture and deposit it in the reject chute 101. Program switches $P_{17}$ and $P_{19}$ in the memory and relay circuits, respectively, allow signals to be applied to the read-in solenoids $S_1$–$S_6$ and relays $R_1$–$R_6$ only at certain times, see FIG. 38. The use of holding magnets 313 and 315 for holding the switch operating arms 309 in each of their two positions provides a memory device which is magnetically bi-stable. This construction allows a more simple switch arm mounting and actuating mechanism, and one in which there is no danger of the arms accidentally dropping from their intended position due to vibration and other reasons.

Looking now at FIGS. 11 and 25–27, the operation of the reject gripper 99 will be described. The reject gripper 99 itself is very similar to pick-up arm 84 but its reciprocating mechanism differs somewhat from that of pick-up arm 84 described above. Bar 100 is mounted in substantially the same manner as bar 84 to reciprocate back and forth between the solid and dotted line positions shown in FIG. 25 and up and down at each end of its stroke. Bar 100 is slidably mounted in supports 320 which in turn are moved up and down on vertical posts 321 by a pair of cams 321' which are engaged by follower rolls 322 carried by the supports. Cams 321' are driven at the same speed by chains 323 and 324 engaging sprockets 325 and 326 which are directly geared together by a pair of gears one of which is fixed to cam shaft 85. Longitudinal movement of bar 100 is controlled by a cam 327 fixed to cam shaft 85 which engages a follower roll 328 lying between the cam and follower surface 329 fixed to bar 100, and carried on the end of an arm 330 pivoted to the frame at 331. The bar 100 is normally spring pressed to the right, looking at FIG. 25, by a spring, as is bar 84', but not shown here.

The gripper 99 is mounted on a plate 332 to which one end of a tie rod 333 is pivoted at 334, while the other end of the tie rod is pivoted at 335 to the arm 330. Accordingly, the gripper 99 is oscillated back and forth with the bar 100 through the tie rod 333. The gripper 99 is raised and lowered by up-and-down movement of bar 100 through a tie rod 336 pivoted at one end 337 to one of the supports 320, the other end of said tie rod being pivoted at 338 to a pair of spaced bars 339 pivoted at 340 to a fixed support. A pair of vertical straps 341 fixed at their lower ends to a cross bar 342 are pivoted at 343 to a point on bars 339 intermediate the ends thereof. Looking at FIG. 25, it will be seen that when the bar is in its extreme right-hand position and at the bottom of its vertical stroke, the gripper 99 is over the camera fixture H and in a lowered position to grip the camera front F should it be operated. From this position the first thing that happens is that cams 321' rotate to raise the bar 100 vertically while it stays in its right-hand position. At the same time through the action of tie rod 336, bars 339 and straps 341 the gripper 99 is lifted from the camera fixture. The cam 327 then moves the bar 100 and gripper 99 through tie rod 333 to the left where the gripper 99 is above the reject chute 101. Then while the bar and gripper are in this position the cams 321' lower the bar and gripper to a point just above the chute 101 where the gripper can be actuated to release a camera front F into the chute should it have one in its grasp. The gripper 99 and bar 100 are then raised vertically again after which cam 327 allows the bar and gripper to again move to the horizontal position shown in FIG. 25. It might be pointed out that the drive for the cams 321' is twice that for the cam 327 so that they make two revolutions for each revolution cam 327 makes. This is to raise and lower the gripper at each end of the bar's horizontal stroke. The operating characteristics and cycle of these cams are shown in FIG. 39.

Referring now to FIGS. 26 and 27, the construction and operation of gripper 99 will be described. Pivoted at 350 on two depending arms 351 fixed to cross bar 342 are a pair of bell cranks 352. Channel-shaped jaws 353 fastened to the lower ends of bell cranks 352 are normally urged into a gripping position by a tension spring 354 and in which position they will engage the tongue 63 on the side edges of a camera front F. The jaws 353 are normally moved to an inoperative, or open, position by the downward pressure of a plunger 355 of an air cylinder 356 into which compressed air is fed through air line 357. The air line 357, like the feed line of the air cylinder on each of the camera grippers on this machine, except gripper 114, includes a conventional solenoid-operated, spring-return, three-way valve 358, which in this instance is normally open to admit compressed air to the cylinder when the solenoid is de-energized, but which closes and exhausts air from the cylinder when the solenoid is energized. The solenoid for operating valve 358 of gripper 99 is noted as Sg in the wiring diagram of FIG. 22, and this type of valve is shown in FIG. 27 in accordance with the JIC (Joint Industry Conference) designation as a solenoid-operated, normally open, spring-return, three-way valve.

When a signal comes from the memory system 97 that a defective camera front is at station VIII, one of the relay contacts $r_1$–$r_6$ of the memory relays $R_1$–$R_6$ is closed to prepare for energization of the solenoid Sg of the valve in the line of air cylinder 356. However, before the gripper 99 can lift the rejected camera front from station VIII, the clamping jaw 160 of the fixture H must be opened, see FIGS. 14, 15 and 16. This means that the latch bar 175 of the fixture must be pushed forward before the gripper starts its vertical rise. In FIG. 26 the mechanism for accomplishing this has been shown, but only the latch bar 175 of the fixture has been indicated for purposes of clarity. As the plunger 355 starts its upward movement as the jaws 353 close under the action of spring 354, it engages the yoke end 359 of a bell crank 360 pivoted at 361 to the supporting plate 332, and causes the bell crank to move clockwise about its pivot so that an adjustable screw 362 on the end thereof engages and moves the latching bar 175 to releasing position. It will be noticed by referring to FIG. 27 that the yoke end 359 of bell crank 360 is positively connected to the plunger 355 by having lugs thereon engaging a groove in the plunger as the result of which the bell crank will be moved to an inoperative position when the plunger 355 is held down in its normal position.

When the gripper 99 reaches its lowered position over the reject chute 101, a cam-operated, normally open program switch P-16 in the line containing solenoid Sg for operating the valve 358 for air cylinder 356 is opened, thus breaking the circuit to solenoid Sg causing air valve 358 to open and open jaws 353 to release the camera front F into the chute, see FIG. 22. This cam-operated program switch P-16 is only one of several contained in a program switch box P and containing a plurality of cams mounted on a cam shaft 365 driven from cam shaft 85 through a chain and sprocket drive 366. Looking at FIG. 38, which shows the program switch operating sequence diagram, it will be seen that program switch P-16 is closed only while cam shaft 85 is in the 45°–255° portion of its cycle and at all other times the gripper 99 cannot be opened to release a camera front F held thereby. In other words, when the program switch P-16 opens, the gripper is over chute 101 and in its lower position, see FIG. 39. Until the gripper 99 returns to a point above the conveyor, program switch P-16 remains open and solenoid Sg is deenergized to open and put compressed air into air cylinder 356 to open the gripper so it will be ready to pick up the next reject camera front when a signal is received from the memory unit and switch P-16 is again closed at the point in the cycle when the gripper drops down on a camera front on the conveyor. After a camera front F is dropped into chute 101, it will slide down until it reaches a door 102 which has been opened by a signal from the memory system 97 in accordance with the type of failure encountered whereupon it will drop into a bin classified in accordance with said specified failure.

After leaving station VIII, the fixtures H are indexed through stations IX–XIII where nothing happens. When a fixture H reaches station XIV with a camera front F in position therein, it has an assembled camera back B dropped thereon. Referring now to FIGS. 11, 25, 28 and 29, the mechanism for assembling the red windows 81 in the camera backs B and placing the backs on camera fronts F at station XIV will be described. The camera backs B, without a red window 81″, are continually fed by an endless conveyor belt 104 which is driven by a motor M_b to a position opposite station XIV, see FIG. 11. They are picked off the conveyor by a gripper 105 which is fixed to a bracket 372 connected to the end of bar 100 by bolts, or other suitable means, and placed on a heated die where the red window is assembled to the back. Another gripper 109, similar to gripper 105, is also fixed to the bracket 372 for lifting the assembled camera back B from the heated die and placing it on the camera front F at station XIV.

Since both grippers 105 and 109 are alike, only one will be described in detail, corresponding parts of the other being designated by the same reference characters primed (′).

Gripper 105 is very similar to grippers 84 and 99 previously described, in that it comprises a pair of bell cranks 374 pivoted at 375 on a fixed cross bar 376. Bell cranks 374 are normally pulled together by a spring 377 so that the hooked ends 378 of fingers 379 and 380 will engage under the top edge and bottom edge of the camera back, respectively. The fingers 379 and 380 are of a different length equal to the dimension x shown in FIG. 6. The gripping fingers 379 and 380 are opened to release or pick up a camera back when compressed air is admitted to an air cylinder 381 to cause a plunger 382 to press down on the ends of arms 383 of bell cranks 374. Each of the grippers 105 and 109 includes a pair of spaced plates 384 which engage the sides of the camera back to align the backs properly to be positioned on the red window die and/or the camera front as they are moved to these positions as will now be described.

Looking now at FIGS. 11, 25, 29 and 30, between the camera back conveyor 104 and the fixture H position at station XIV there is a reciprocating shuttle or table 107 slidably mounted in a guideway 385 to move between the full line and dotted line positions shown in FIG. 30. Carried by shuttle 107 is a pair of vertical posts 386 and 386′ on the top of which there are fixed electrically heated die members 106, 106′, of the form best shown in FIG. 31, and onto which the red windows 81″ are adapted to be deposited from chutes 108 and 108′. As clearly shown in FIG. 31, the posts 386 and 386′ are hollow and the die members 106, 106′, which are electrically heated by a heating element 388 having leads 389, are slidably mounted in the post and normaly urged in an upward direction by a coil spring 390. These heating elements are shown in branch 3 of the control circuit in FIG. 22 and connected to a rheostat X for temperature control. The red window 81″ is deposited on top of the die member 106, after which the camera back B is placed over the die with the window inserted into the hole 80 in the back. Now when a companion die 390′, of the form best shown in FIG. 31, is brought down on top of the die 106, the red window is first deformed into a concave shape as defined by the surface of die 106, then die 106 is depressed so that the vertical wall of the window is deformed over the annular shoulder in the hole in the camera back, as best shown in FIG. 8, to positively fasten the window in the hole in the back.

The shuttle 107 is reciprocated between its two positions by a cam-operated linkage generally indicated at 110 and which comprises a lever 391 of adjustable length having a pin 392 on one end engaging a transverse groove 393 in the shuttle 107. The other end of the lever 391 is fixed to a split lug 394 capable of being locked by bolts 395 to a rotating post 396. This post 396 is oscillated by a lever 397 fixed thereto and having a follower roll 398 which rides in a cam groove 399 in cam member 400 fixed to shaft 401 which is driven through gearing 402 which includes a gear 403 fixed to cam shaft 85. The gear drive for cam 400 is such that it makes two revolutions for each rotation of cam shaft 85 and thus moves the shuttle 107 between its two positions for each indexing of the fixture carrying chain 80, as shown on the cam chart shown in FIG. 39.

The red windows 81″ are carried by gravity down two chutes 108 and 108′ in which they are mounted side by side with their open ends down, see FIG. 30. The lower end 405 of each chute 108 and 108′ is separated from the chute proper, as shown at 406, and is connected to the chute proper by a flexible hinge member 407 which allows the chute ends to be raised slightly to allow the die members 106′ and 106 to move into a position to have the last window on the chute ends to be dropped on top of the dies. As the shuttle 107 is moved toward the position shown in FIG. 30, a block 408′ pivoted at 409′ to the end of the shuttle engages an ear 410′ and raises the end 405′ of the chute to allow the die 106′ to move under the end of the chute. As the shuttle reaches the end of its stroke, the ear 410′ drops off block 408′ and a red window 81″ in the end of the chute drops onto die 106′. At this time the other die member 106 with a red window 81″ on the top thereof which was picked up from chute 405 is moved into a position to have a camera back B placed thereon by gripper 105. When the shuttle 107 moves to the right, looking at FIG. 30, and to its other, or dotted line, position, the die 106′ with a red window thereon moves to the position occupied by die 106 and die 106 moves under chute 405 to pick up a window therefrom. The blocks 408 and 408′ are pivoted to the shuttle so that they can swing down and pass ears 410′ and 410 when moving away from the the chutes, the springs 411 and 411' acting to raise them to their operative position.

Since the grippers 105 and 109 are fixed to the end of bar 100 which also carries reject gripper 99, it will be understood that they are moved from the one extreme longitudinal position shown in FIG. 29 where gripper 105 is above the camera back conveyor 104 and gripper 109 is above the shuttle 107, to another extreme longitudinal position, shown in FIG. 25, where the gripper 105 is above the shuttle 107 and gripper 109 is above the fixture H at station XIV. Likewise, at the end of each longitudinal stroke, the grippers 105 and 109 are lowered and then raised vertically.

When the bar 100 is in its extreme right-hand position and is dropped to its lowermost vertical position, the valves in air lines supplying air cylinders 381 and 381' are closed to allow the grippers 105 and 109 to close under the action of springs 377 and grab hold of a camera back B on the conveyor and a camera back on one of the dies 106 or 106' which just has had a red window assembled therein. Then the grippers rise vertically and then move horizontally to a position where gripper 109 with a camera back B in its grasp is above fixture H at station XIV and gripper 105 with a back in its grasp is above the other heated die 106 or 106' which has moved into position by operation of shuttle 107. Then the bar 100 and grippers 105 and 109 move vertically downward, gripper 109 depositing its camera back on the camera front at station XIV and gripper 105 placing its camera back on die 106 or 106'. Compressed air is admitted to air cylinders 381 and 381' by opening of valve $V_b$ upon energization of solenoid $S_b$, as will be hereinafter described, so that grippers 109 and 105 will be opened and leave their backs on the camera front and die, respectively. The valve $V_b$ in the supply lines of air cylinders 381 and 381' operate in response to a program switch $P_{13}$ operated by a cam in the program switch box P to hold the grippers 105 and 109 open until they again reach a position where they are again able to pick up a camera back from the conveyor 104 or the dies 106 or 106', respectively. Since both air cylinders 381 and 381' normally operate the same way at the same time, the air lines for these two cylinders can be connected together and can be operated by a single conventional, solenoid-operated, normally closed, spring-return, three-way valve. A piping arrangement for accomplishing this result is shown schematically in FIG. 28. When air valve $V_b$ is opened upon energization of its solenoid $S_b$, air is fed into cylinder 381 from supply line L through line 381" and into cylinder 381 through line 411" and the normally open exhaust port of solenoid-operated, normally closed, spring-return valve $V_o$. Valve $V_o$ has its inlet port connected directly to the air supply line L by line 411"' so that it can be cut off from the source of air independently of air cylinder 381' for reasons hereinafter set forth. The solenoid for this valve is shown in the wiring diagram in FIG. 22 as $S_h$. The branch A of the control circuit containing solenoid $S_b$ contains a normally open program switch $P_{13}$, which as shown in FIG. 38, is closed only during the first 45° and last 105° of rotation of cam shaft 85.

If an empty fixture H moves into station XIV, the gripper 105 is held open and no camera back will be picked off the conveyor 104 and placed on the die 106 or 106' in position to receive it. Also, the feeding of red windows from chutes 108 and 108' is stopped for the feed of the shuttle 107 which would occur at this time. To this end, a normally open switch 415 is mounted on the frame at station XIII so that a roller 416 thereon will be engaged by the latch arm 175 on a fixture H which is moved forward to a released position, thus indicating an empty fixture H. In FIG. 25 the latch arm 175 on a fixture H is shown in a latching position indicating a loaded fixture so that it passes roller 416 without engaging and operating switch 415. This tripping of switch 415 occurs in that portion of the cycle during which the air cylinders 381 and 381' are exhausted to allow the grippers 105 and 109 to pick up a camera back from the conveyor or dies 106, 106', respectively. Looking at the wiring diagram of FIG. 22, closing of switch 415 in branch 7 of the control circuit causes energization of relay $CR_3$ which in turn closes relay contacts $cr_3$ in branch 8 to energize solenoid $S_h$ which opens valve $V_o$ in the air line to air cylinder 381 controlling gripper 105, see FIG. 28, which prevents the gripper from feeding a back from conveyor 104 to a die 106 or 106'. During this time, however, the gripper 109 can pick up a back from the die 106 or 106' and place it on the camera front at station XIV. At the same time a second set of normally open contact $cr_3$ on relay $CR_3$, which are in the control circuit of rotary solenoids 103, are closed to energize two solenoids $S_c$ and $S'_c$. As shown in FIG. 30, the plungers of these solenoids $S_c$ and $S'_c$ are connected to the chute ends 405 and 405' so that when they are energized, they lift the chute ends 405 and 405' above the path of dies 106 and 106' so that no red window is fed to the dies on the stroke of the shuttle which occurs at this time.

After a fixture H has a camera back B placed on the camera front F it is carrying at station XIV, it indexes through stations XV, XVI and XVII, where nothing happens, to station XVIII where metal clips 75 are placed on and crimped over the mating tongue portions 73 on the two sides of the assembled camera parts to hold the backs and fronts in assembled relation.

Referring now to FIGS. 11 and 32–35, at station XVIII there is a fixed vertical support 425 located inside chain 80 or the path of the fixtures H and from the top of which a horizontal support 426 extends out over the fixture path. Reciprocally mounted on the front face of vertical support 425 is a plate 427 carrying a follower roller 428 situated in a cutout 429 in the plate. This follower roller 428 engages a cam 430 mounted on the end of drive shaft 431 journalled at one end in bearing 432 on the vertical support 425 and at the other end in a bearing 432' carried by post 433 fixed to the frame of the machine. This shaft is connected to the cam shaft 85 by bevel gears 434 and 435 and the gear ratio is such that the cam 430 makes one revolution for each revolution of the cam shaft 85. As the cam 430 rotates, it reciprocates plate 427 on vertical support 425 between the raised position shown in FIG. 32 and the lower position shown in FIG. 33.

On both sides of the front face of plate 427 there is a slide 436 mounted on ball races 437 which are confined by guides 438 fixed to the plate. These slides 436 are free to move sideways on plate 427 and have follower surfaces 439 which engage a cam 440 fixed to the end of drive shaft 431 next to cam 430. The slides 436 are normally moved toward one another by springs 441 to the full line position shown in FIG. 32. They are moved away from one another, to the dotted line position shown in FIG. 32, by the cam 440 as it rotates. The cam 430 for reciprocating plate 427 and cam 440 for reciprocating the slides 436 are so arranged that when the plate is at the top or bottom of its stroke, the slides 436 are moved to their innermost positions, while the slides are moved apart just before the plate starts to move up or down and during the time the plate is moving between its two positions.

Fixed to, and extending vertically downward from, the horizontal support 426 in overhanging relation with the fixture path is a clip feeding means designated broadly at 450, see FIG. 34. This clip feeding means comprises a pair of transversely separated guideways 451 down which the clips 75 move by gravity from a supply above, not shown. As will be seen in FIG. 34, the clips 75 rest upon the end of one another with the open side of the curved end facing inwardly, or toward one another. The bottom two clips are positively latched in the guideways and released in pairs by means of a unique mechanism now to be described.

Looking at FIG. 34, it will be noted that the bottom clip in each of the guideways 451 is held by a pin 452 on the end of one arm of a pair of like T-shaped cranks 453 pivoted at 454 engaging the curved end of the bottom clips 75. At the same time pins 455 on the end of the other arms of the T-shaped cranks 453 are moved out of the guideways. The two cranks 453 are connected by a ball and slot joint 456 so that as one crank pivots between its two positions, the other pivots in just the opposite sense. From the midpoint of one of cranks 453 there extends an arm 457 to which one end of a spring 458 is attached. The other end of this spring is attached to the plate 427 so that as the plate moves between its raised and lower positions, the end of the spring 458 moves past the pivot points 454 of cranks 453. Thus when the plate 427 is in its raised position, the spring 458 pulls upwardly on the arm 457 and tends to move the cranks to the position shown in FIG. 34. When the plate 427 is in its lower position, the spring tends to pull down on arm 457 to pivot the cranks in an opposite sense where pins 452 will be moved out of engagement with the bottom clips to allow them to drop out of the guideway under the action of gravity and at the same time pins 455 move into engagement with the next pair of clips to hold them in the guideways 451.

So that no attempt will be made to feed a pair of clips should an empty fixture H be in position at station XVIII, the following latch mechanism for the release of the clips from the guideways is provided. Pivoted at 460 to plate 427 is a bell crank 461 which is pivoted in a counterclockwise direction by a spring 462 to a position where arm 463 of the crank comes against a stop pin 464 on the plate 427. It should be remembered that this bell crank is carried by and moves up and down with the plate 427 as it reciprocates. When the plate 427 moves toward its lower position, see FIG. 33, just before the plate reaches its lower position a roller 465 on the arm 466 of bell crank 461 moves into engagement with a camera back B at station XVII. This causes the bell crank to pivot clockwise and a pin 467 on the end of arm 463 engages the extension of a notched latch bar 468 pivoted at 469 to the stationary part of the clip feeding mechanism and moves it counterclockwise about its pivot against the action of a spring, not shown. This moves the notch portion 470 out of engagement with the T-shaped crank 453 just at the time the spring 458 moves to a position where it tends to snap the bell crank to the opposite position to that shown in FIG. 34. If, however, when the plate 427 moves down, the fixture H at station XVII is empty or there is no complete camera back and front combination in the fixture, the bell crank 461 will not be operated to release the latch for the clip feeding means and no clips will be fed when this fixture reaches station XVIII.

For taking the clips 75 from the clip feeding means, placing them in embracing relation with the mating tongue portions 73 at both sides of the camera body and crimping them into clamping relation therewith, the following mechanism is provided.

Oscillatably mounted on the lower end of the clip feeding means 450 is a clip pick-off spool 472 adapted to oscillate between a clip pickup position shown in solid lines in FIG. 35, wherein a pair of guide bars 473 on either end thereof are in a vertical position and in alignment with opposite ones of the clip guideways 451 to receive and guide the clips 75 dropping therefrom onto the ends of the spool, and a horizontal take-off position, shown in dotted lines in FIG. 35, wherein the clips 75 are picked off the ends of the spool 472 by gripping and clamping means to be described. The spool 472 is oscillated between its two positions in response to vertical movement of the plate 427 by virtue of the linkage shown in FIG. 36. This linkage includes a lever 474 pivotally connected at one end 574 to a bracket 575 clamped around the center portion of the spool 472 and at the other end to a pin 576 carried by a lever 577 having one end clamped at 578 about a horizontal rotatable rod 579. The other end of the lever 577 is pivotally connected to a pin 580 extending between a pair of perforated lugs 581 fixed to, and extending from the front of, the plate 427. Fixed to and extending from the rod 579 are a pair of horizontally spaced arms 582 to each of which is pivotally connected one end of bars 583 which extend vertically downward and have a presser foot 584. As the plate 427 reciprocates between its upper and lower positions, the linkage shown in FIG. 36 will move between the dotted and solid line positions shown therein. When the plate 427 is in its lower position, the spool 472 will be oscillated to its clip receiving position shown in FIG. 35 and the presser foot 584 will be lowered upon the top of the camera back at station XVIII to hold the camera front and camera back firmly together while the clips are crimped in clamping relation as will be described. At this time a valve, not shown, in the vacuum line 479 connected to the bore 480 extending longitudinally of the spool 472 and opening into the end faces thereof between the guide bars 473, is opened and the clips 75 are held onto the ends of the spool through the combined action of guide bars 473 and suction. Suction is maintained on the spool ends during the time they are being oscillated 90° to their horizontal position, by upward movement of plate 427, where the clips are removed by gripping and crimping means now to be described.

Fixed to each of the reciprocating slides 436 is a clip holding block 481 having a channel-shaped clip engaging end 482 adapted to embrace the web portion of a clip 75, as best shown in FIGS. 32A and 33A, when the clips 75 are in a horizontal position. Each block 481 has a vacuum chamber 483 to which a suction line, not shown, may be connected by way of a port 484 in the side of the block. The chamber 483 is connected to the clip engaging end 482 of the block by a conduit so that the clip 75 is maintained on the end of the block by suction when a valve, not shown, in the suction line is opened. The vacuum for blocks 481 and spool 472 is supplied through lines, not shown, from a conventional vacuum pump, not shown, adapted to be driven by motor $M_8$ shown in the wiring diagram of FIG. 22.

On each slide 436 there is mounted a pair of air-operated clip crimping jaws which cooperate with the blocks 481 in carrying the clips from the spool 472 down to the camera on the fixture and placing the clips over the tongues 73 on the camera parts and finally crimp the clip to lock the camera parts in assembled relation. Since both sets of these air-operated jaws are identical in construction and operation, only one set of them will be described in detail with corresponding parts of the two being designated by the same reference character. Pivoted on the reciprocal slide 436 at points 485 and 486 are two bell cranks 487 and 488, respectively. One end of each crank terminates in a jaw portion 489 which is adapted to engage the side walls of the clips 75 when they are held on the ends of blocks 481, see FIGS. 32A and 33A. The other ends of the cranks support a two-way air cylinder 490, the end 491 of crank 487 being connected to the shell of the cylinder by a gimbal connection indicated at 492 and the lower end of the plunger 493 of the air cylinder being connected to the other end of crank 488 by a loose pin connection indicated at 494. By virtue of this connection, when air under pressure is allowed to enter the port 495 in the top of the cylinder, the plunger 493 is forced downward and the shell upward to spread the ends of the cranks 487 and 488 connected to the cylinder shell and plunger apart and thereby causing jaws 489 to move together and crimp the side walls of the clip 75 over the mating tongue portions 73 on the camera back and front, see FIG. 33A. Now when air under pressure is introduced into port 496 at the bottom of the air cylinder, the cranks are pivoted 85, the camera assembly is moved away from chain 80 and over chute 115. When the bar 84' again reaches the bottom of its vertical travel, a cam, not shown, on shaft 85 mechanically opens the valve in air line 177' causing the jaws 203' to open and release the camera assembly into chute 115. While in FIG. 17 the gripper 114 should be shown in position over the fixture H when the bar 84' is in its extreme right-hand position to put gripper 84 over the conveyor 83', for sake of clarity and to cut down on the number of drawings, the gripper 114 has been shown in the position it assumes when bar 84' is in its other position, bar 84' being shown broken to account for this discrepancy. It will be appreciated that when gripper 114 is in the solid line position shown in FIG. 17, then gripper 99 will be in its dotted line position.

After a fixture H is emptied at station XXI, it indexes through stations XXII–XXIV and back to station I where it is ready to receive another camera front F from conveyor 83'. Normally all fixtures after leaving station XXI should be empty and have their jaws open so that they are in a condition to receive another camera front when they again reach station I. To be sure the fixtures are in such condition upon reaching station I, there could be arranged a switch at any one of stations XXII–XXIV for detecting a latched fixture and the closing or opening of which would automatically stop the machine. While no such detector switch is shown at any one of these stations, it could be arranged exactly like switch 415 at station XXII for detecting the approach of an empty fixture H approaching station XIV, except that in this case the operation of the switch would stop the conveyor rather than paralyze the operation of gripper 105 so that it will not feed a camera back onto the heating dies.

It is believed that from the above description the operation of the camera assembling and testing machine constituting the present invention will be clearly understood. It will be appreciated that this machine performs automatically many functions which have heretofore been carried out manually by a group of separate operators. The only manual operation necessary in the operation of this machine is to load the camera front conveyor 83' with camera fronts and to load the camera back conveyor 104 with backs as well as to load the clips 75 and red windows 81''' into their feeding means. One or two operators required for these loading operations can also supervise the function of the machine and remove defective parts and restart the machine as the presence of defective parts requires. Each camera assembled by this machine is thoroughly tested and those reaching the final discharge station are known to be in perfect working order. Those camera shutters which are rejected are sorted according to the type of test they failed so that the rejects need only be checked for a specific reject and sent to a given point for correction rather than having to check each reject for all tests to find out the reason for failure. This cuts down the handling of rejects considerably. The memory system used on this machine for putting the reject signals into the reject gripper and the sorting means for the rejects is magnetically bi-stable so that it is adapted for operation on an intermittent machine of the type described without danger of its settings being upset by vibrations, quick accelerations, etc.

While we have shown and described a preferred embodiment of a camera assembling and testing machine constructed in accordance with the present invention, we are fully aware that many modifications thereof are possible. Our invention, therefore, is not to be limited to the specific structural details disclosed, but is intended to embrace all modifications coming within the scope of the appended claims.

Having thus described our invention, what we claim as new and desire to secure by Letters Patent of the United States is:

1. In an apparatus for assembling a camera front having a shutter equipped with a flash synchronizer circuit and a double exposure prevention mechanism to a camera back the combination of an endless conveyor; means for intermittently indexing said conveyor through a plurality of stations; a plurality of fixtures carried by said conveyor and spaced therealong so that each time said conveyor comes to rest one of said fixtures stops at a successive one of said stations; said fixtures adapted to receive and support a camera front in definite orientation, and each including a clamping jaw movably connected thereto to move between an open position, wherein a camera front may be loaded into and removed from said fixture, and a latched position, wherein the camera front is locked in the fixture and a camera back may be placed on the camera front while held by the fixture; a loading station at which each empty fixture stops during indexing of the conveyor; means for feeding camera fronts to said loading station; means for automatically picking up a camera front from said loading station and placing it on an open fixture in said definite orientation each time one of the fixtures on the conveyor stops at said loading station; means at a succeeding station for testing at least two operating characteristics of the shutter in the camera front in the fixture when it stops at said station; a memory unit indexed in synchronism with said conveyor and including means movable from a normally inoperative position to an operative position in accordance with any faulty operating characteristic of a shutter as detected at said testing station; means for moving said last-mentioned means of said memory unit to said operative position as a result of any one of the tests failed and in accordance with the type of test failed, a reject chute at a succeeding reject station including means for sorting camera fronts in accordance with the type of test failed; means at said last-mentioned reject station for automatically opening the clamping jaw of a fixture and lifting a camera front from the fixture and depositing it in said reject chute when a reject signal is received; means operated by said memory unit for producing said reject signal when a reject shutter reaches said reject station and at the same time activating the sorting means in said chute in accordance with the type of test failed; means at a succeeding station for automatically placing a camera back on each camera front moved into said station; means at a succeeding station for positively fastening the combined camera front and camera back in assembled relation; means at a succeeding station for testing the assembled camera fronts and backs to determine if they are properly secured together and adapted to automatically stop the conveyor when an improperly assembled pair is encountered; and means at a succeeding station for opening the clamping jaw of any closed fixture and lifting any properly assembled camera front and back off its fixture.

2. In an apparatus for mounting the red exposure identification window in camera backs, assembling a camera front and a camera back, each of the camera parts having a tongue portion extending along two edges which mate when the parts are combined, and testing a flash shutter in each camera front for at least two different operations prior to assembly with a camera back the combination of an endless conveyor; means for intermittently advancing said conveyor past a plurality of stations spaced from each other along the path of the conveyor by distances such that a given point on the conveyor stops at each station during its intermittent movement; fixtures fixed to and carried by said conveyor at points spaced along said conveyor so that each fixture stops at each of said stations as the conveyor is intermittently advanced; said fixtures adapted to receive and support one of said camera fronts in a definite orientation and each including clamping means movably connected thereto to move between an open position, wherein a camera front may be placed on and removed from the fixture, and a latched position wherein the camera front is positively held in said fixture so that a camera back may in the opposite direction to move the jaws 489 to the position shown in FIG. 32A where they merely aid the end of block 481 to carry a clip 75 from the spool 472 and place it on the mating tongue portions of the camera front and back. The two ports 495 and 496 of the air cylinder 490 can be connected to the same source of compressed air by a three-way valve, not shown, which in each of its positions will allow air to enter one of the ports while exhausting the other. This valve will be controlled by a cam, not shown, fixed to the cam shaft 85 so that the jaws 489 will be moved to their clamping position just after clips 75 have been placed over mating tongue portions on the camera front and back at station XVIII and will be held in an open position at all other times.

The over-all operation of the clip applying mechanism will be clear from the following description of a complete cycle of the mechanism. At the beginning of an indexing operation of the chain 80 the parts are in the position shown in FIG. 33 where plate 427 is in its lower position as are clip holding blocks 481 and clip crimping jaws 489. Furthermore, blocks 481 and jaws 489 are moved to their inner positions adjacent the camera body on fixture H to which clips 75 have just been applied since cam 440 is in its vertical position. The clamping jaws 489 are open since air has been put on port 496 of the air cylinder and exhausted from port 495. Also spool 472 is in the position shown in FIG. 35 with the guides 473 on the ends thereof aligned with the clip guideways 451 and clips 75 have been dropped onto the ends of the spool by reason of the roller 465 on bell crank 461 having engaged a camera part at station XVIII during downward movement of plate 427. The suction line to spool 472 has been opened to hold the clips on the end thereof by vacuum.

Now just before the indexing movement of the chain 80 starts, the cam 440 first moves the slides 436 horizontally away from one another to remove the clamping jaws from the camera body at station XVIII and then the cam 430 starts to move the plate 427 upwardly while cam 440 continues to move the clamping jaws to their extreme separated positions. Just as soon as the clamping jaws have been moved upwardly out of the path of the fixtures on the chain 80, the chain starts to index a camera assembly from station XVII to station XVIII. During this time the plate 427 reaches its upper position and rotates the spool 472 so that the clips 75 on the ends thereof are horizontal. The cam 440 allows jaws 489 and blocks 481 to move into engagement with the clips on the spool ends, see FIG. 32A, at which time suction is cut off spool 472 and applied to blocks 481 to that the blocks and clamping jaws now hold the clips 75. Then continued rotation of cam 440 moves the blocks 481 and jaws 489 with the clips 75 transversely away from the spool ends and when they have moved far enough to clear the guides 473 on the ends of the spools, cam 430 starts to drive, or allow, the plate to move to its lower position. During this time the spool is oscillated 90° to its clip receiving position by the linkage shown in FIG. 36 connected to the plate and if a camera assembly is at station XVII, the roller 465 engages it to operate crank 461 and unlatches the clip feed to drop a pair of clips onto the end of the spool. When the plate reaches its lower position, cam 440 allows blocks 481 and jaws 489 to move toward the camera at station XVIII and slip the clips 75 carried thereby over the mating tongues 73 thereon, see FIG. 33A. At this time air is cut off port 496 of air cylinder 490 and applied to port 495 to cause the jaws 489 to close and crimp the clips 75 over the tongues 73 on the camera parts to firmly clamp them together. The timed relation of the cams on cam shaft 85 for operating the crimping fixture air valves and the crimping fixture vacuum valve is shown in FIG. 39. To insure that the camera fronts and camera backs are clamped in tight relation, it has been found desirable to press them tightly together just before the clips 75 are crimped over the mating tongues 73, and this is accomplished by presser foot 584, as above described.

When a camera assembly is indexed to station XIX, it is tested to be sure that the camera front and camera back have been assembled sufficiently tight, and, if not, the machine is automatically stopped until the operator removes this part and intentionally restarts the machine. To this end the mechanism shown particularly in FIG. 37 is provided. Fixed to the frame of the machine and extending upwardly toward the chain 80 is a supporting arm 500. Pivoted at 501 on the upper end of this arm is a bell crank 502 having a claw or lifter portion 503 which is adapted to move into the open end of the camera assembly and lift up against the camera back B and try to lift it off of camera front F when the crank is moved clockwise about its pivot 501 to the solid line position shown in FIG. 37. When the crank 502 is pivoted counterclockwise to the dotted line position, the lifter portion 503 is removed from the path of the fixture H so that the chain 80 is free to index.

This crank 502 is moved between its two positions in timed relation with an indexing of the chain 80 by connecting it to the reciprocal plate 427. To this end the plate 427 has a bar 504 extending transversely thereof, said bar being of such length that the end thereof overhangs station XIX, see FIG. 33. Pivoted at 505 on the crank 502 is a tube 506 containing a compression spring 507. Pivoted at 508 to bar 504 is a rod 509 which telescopes within tube 506 and has a pin 510 extending through a longitudinal slot 511 in the tube 506. When the plate 427 moves upwardly, the pin 510 engages the upper end of slot 511 in tube 506 and pivots crank 502 to move its lifter portion 503 out of the camera body, see FIG. 32, and dotted line position of FIG. 37. When the plate 427 descends, the pin 510 on rod 509 transmits downward movement through spring 507 to tube 506 and moves the lifter portion 503 of crank 502 into the camera body and tends to lift the camera back from the camera front. If the camera back B can be lifted relative to the camera front to any extent, the button 512 of normally closed switch 513 is depressed to open the switch and thus stops the machine, thereby indicating to the operator a faulty assembly was made at station XVIII. Looking at FIG. 22, it will be seen that switch 513 is in the branch 5 of the control circuit containing relay $CR_1$, the contacts $cr_1$ of which are in the supply line $L_1$ in parallel with the start switch $PB_1$ located at the machine. Opening of contacts $cr_1$ cuts power from relay $CR_2$ and causes the normally open contacts $cr_2$ thereof to open and cut power from the clutch solenoid CS and the normally closed contacts $cr_2$ to close putting power on the brake solenoid BS.

If the camera assembly leaving station XVIII checks out all right at station XIX, then the chain 80 continues to index this fixture to station XXI where the assembly is picked off of its fixture by gripper 114 and is dropped onto an inclined outlet chute 115, see FIGS. 11 and 17. The gripper 114 is essentially the same in construction and operation as gripper 84 for lifting the camera fronts F from the conveyor 83' and placing them on the fixtures H, see FIG. 18, except that it does not have the presser foot 209 for closing the fixture. It is carried on the end of reciprocating bar 84' so that when this bar is in one extreme position for gripper 99 to pick up a camera front F from conveyor 53', the gripper 114 is moved over and down upon the camera assembly at station XIX. At this time the air is cut off its air cylinder 207' so that springs similar to springs 202 on gripper 84 may close its pivoted jaws 203' onto the sides of the camera assembly. As the gripper 114 moves into position over the fixture H, wedge-shaped projection 700 extending therefrom engages latch 175 to open the fixture. Now as the bar 84' raises, through the action of cams 183 and 183' the gripper lifts the camera assembly from the fixture. When the bar 84' is then moved longitudinally to its left by cam 191 on cam shaft be assembled thereon; means for continuously feeding a group of camera fronts to a loading point adjacent a first one of said stations at which the fixtures on said conveyor stop and with each camera front having the same oriented relation as it reaches said station; means operated in synchronism with said conveyor advancing means for lifting a camera front from said loading point and placing it on an open fixture each time an open fixture stops at said first station and then latching said clamping means on said fixture; means at a station succeeding said first station for testing at least two operating characteristics of the shutter in said camera front, and including a source of potential; means for connecting the flash circuit of said shutter to said source of potential and tripping the shutter, electrical means adapted to check said shutter and give out a separate reject signal for each operating characteristic that the shutter fails to pass; a memory device into which each reject signal is fed and stored; a reject chute adjacent a reject station succeeding said testing station for receiving camera fronts whose shutters fail any one of said tests; said chute including means for sorting said rejected fronts according to the type of test the shutters failed; means at said reject station operated in synchronism with said conveyor for moving the clamping means of a fixture to its open position and picking a camera front from said fixture and dropping it into said reject chute when a signal is received from said memory device; means operated by the reject signals in said memory device for sending a signal to said last-mentioned means and at the same time setting said sorting means in said chute in accordance with the type of test the shutter in a fixture reaching said reject station failed; means adjacent a station succeeding said reject station for feeding camera backs without red windows to a loading position with the same orientation; a heated die, means operated in synchronism with said conveyor for feeding red windows to said die; means operated in synchronism with the conveyor means for lifting a camera back from said loading position and placing it on said die member to insert said window into an aperture in the back wall of said camera back, and at the same time lifting a back from said die member and placing it on a camera front in the fixture at said last-mentioned station; means for detecting the approach of an empty fixture to said last-mentioned station and adapted to render inoperative said means for feeding a back onto said die whereby when said empty fixture reaches said station the back feeding means will not feed a back onto an empty fixture; means at a station succeeding said camera back assembling station for fastening the combined camera fronts and camera backs together by means of metal clips crimped over mating tongue portions extending along two edges of the combined camera parts; means at a station succeeding said metal clip attaching station for testing the effectiveness of said fastening clips and adapted to stop the conveyor if the camera parts are not tightly joined together by said clips; and means at a station succeeding said last-mentioned station for opening said fixture and lifting the assembled camera parts from their fixture and depositing them in a take-away chute.

3. In an apparatus according to claim 2 in which said memory device comprises an indexable member indexed in synchronism with said conveyor, a plurality of switch operating members mounted on said indexable member to move between a normally inoperative position and an operative position wherein they are adapted to engage and close a read-out switch to send a signal to said sorting means and said camera front pickup means at said reject station and spaced along said indexable member by distances such that successive members engage said switch at each indexing movement, a read-in solenoid adapted to be energized by a reject signal from said testing station and move one of said switch operating members to its operative position, said read-in solenoid spaced from said read-out switch by the same number of switch operating members as there are stations between the testing station and said reject station.

4. In an apparatus according to claim 3 including a pair of permanent magnets associated with each switch-operating member to magnetically hold said members in each of their two positions when moved thereto by an instanenous actuation, whereby said memory device is made magnetically bi-stable.

5. In an apparatus for assembling a camera front containing a shutter having a built-in flash synchronizer to a camera back having a red exposure identification window and testing the shutter to be sure it operates satifactorily before being assembled to a back and mounting the red window on the back just prior to assembling it to a camera front the combination of an endless conveyor; a plurality of fixtures fixed to said conveyor at equally spaced points therealong, each adapted to receive a camera front and hold it in definite orientation; each fixture including a clamping means movable between an open position wherein a camera front may be put in and removed from said fixture, and a latched position, wherein it holds the camera front in definite position and will permit a camera back to be placed on said camera front; means for intermittently indexing said conveyor to move each of said fixtures successively into seven stations spaced along the path of said conveyor where the fixtures rest for an interval to permit some operation to be performed; means for continuously feeding camera fronts to a loading point adjacent the first of said seven stations and with each camera front having the same orientation as it reaches said loading point; means operated in synchronism with said conveyor indexing means for picking up a camera front from said loading point and placing it on each open fixture as it stops at said station and then moving the clamping means of the fixture to a latched position; means at the second of said seven stations for testing at least two operating characteristics of the shutter contained in the camera front carried by said fixtures, and including a source of potential; means operated in synchronism with said conveyor indexing means to connect the terminals of the flash switch in said shutter to said source of potential as the camera reaches this station; means for tripping said shutter after these connections have been made; means responsive to said testing means for generating an individual reject signal for each operating characteristic of the shutter which fails to meet specified requirements; a memory device into which each of the signals are fed and stored so as to be read out individually; means for advancing the memory device in synchronism with said conveyor so that reject signals pertaining to a given shutter can be fed out later as said shutter reaches the third or reject station; a reject chute adjacent the third or reject station into which camera fronts having shutters not meeting all the tests are deposited after being lifted from the conveyor; said reject chute including means for sorting each of the rejected camera fronts according to the test failed; means at this station for opening the clamping means of the fixture and removing the camera front from the fixture and depositing it in said reject chute when a signal is received from the memory device that the camera front at this station is defective; means operated by the memory device at the same time for setting said sorting means in the reject chute in accordance with the type of test the shutter in the camera front failed; means at the fourth station for assembling red windows into camera backs and placing a completed camera back on each camera front moved into this station, and including a conveyor for continuously feeding camera backs without red windows to a loading point in definite orientation; a heated die member; means operated in synchronism with said conveyor for successively depositing a red plastic window on said die member; means operated in synchronism with said conveyor for picking up a camera back from said loading point and placing it on said die member to insert the window in an aperture therein; means also operated in synchronism with said conveyor for picking up a camera back from said die member and placing it on a camera front at said fourth station during the time a back is being picked up from said loading point for deposit onto said die member; clip applying means at the fifth station for placing metal clips over mating tongues on opposite edges of the combined camera front and camera back reaching this station and crimping them to positively fasten the two camera parts together; said last-mentioned means including a clip conveyor for feeding a pair of metal clips to a pick-up point and operated in synchronism with said conveyor; clip pick-up means operated in synchronism with said conveyor for picking up the pair of clips from said pick-up point, placing them over the mating tongues on opposite edges of said camera parts and then crimping them to hold the camera parts together; means at the sixth station for testing the assembly of said camera parts and automatically stopping the conveyor and associated cycling mechanism if the parts are not assembled in proper relation; and means at the seventh station for opening the fixture and lifting the assembled camera fronts and camera backs from the conveyor and depositing them in a take-away chute.

6. An apparatus for testing and assembling camera fronts and camera backs according to claim 5, including means ahead of said fourth station for detecting an empty fixture and rendering inoperative said means for placing a camera back on the die member whereby when said empty fixture reaches said station no camera back will be present to be placed on said empty fixture by the back loading means.

7. An apparatus for testing and assembling camera fronts and camera backs according to claim 5, including means ahead of said fifth station for detecting the presence of an empty fixture and rendering said clip conveying means inoperative for one cycle so that no clips will be wasted by the clip applying means attempting to apply them to an empty fixture.

8. An apparatus for testing and assembling camera fronts and camera backs according to claim 5, including means for automatically stopping said conveyor indexing means and associated mechanism operated in synchronism therewith when there is no camera front and camera back at their respective loading points in a given orientation at the time in the cycle of the apparatus when one of these parts is to be picked up and placed on the conveyor and die member, respectively.

9. An apparatus for testing and assembling camera fronts and camera backs according to claim 5, in which the means for feeding the red windows onto said die member comprises a chute down which the red windows are fed by gravity in side-by-side relation, the end of said chute being pivotally mounted to be raised, said die member being carried by a reciprocal shuttle movable between a loading position in which the shuttle moves said die member under the last red window in the chute after a cam on the shuttle pivots the end of the chute upwardly in moving to said position and an operative position in which the camera back is applied thereto; and means stopping the feeding of a red window when an empty fixture is about to move into said fourth station, said means including a solenoid for lifting the pivoted end of said red window chute out of the path of said shuttle and the die member carried thereby, said solenoid being energized by the closing of a normally open switch when engaged by an open latch on a fixture approaching said fourth station.

10. An apparatus for testing and assembling camera fronts and camera backs according to claim 5 in which said means for picking up a camera back from the loading point and placing it on said die member and picking a camera back from the die member and placing it on the camera front at said fourth station comprises a bar, a pair of grippers fixed to said bar in spaced relation such that when one gripper is over the loading point to pick up a back therefrom the other is over the die member to pick up a back therefrom, and when the first one is in a position to place a back on the die member the other is in a position to place a back from the die member on a camera front at said fourth station; means for longitudinally reciprocating said bar to move the grippers between these two positions and to lower and raise the bar in synchronism with said conveyor at each of these positions whereby the grippers may pick up a camera back from one position and deposit it at the other; each of said grippers comprising a pair of normally closed jaws for gripping a camera back; each of said grippers including an air cylinder the plunger of which opens said jaws when air is introduced into said cylinders, air supply lines for each of said cylinders having solenoid-operated valves so arranged that normally both air cylinders are operated by the same valve whereby the two grippers operate simultaneously in synchronism with the conveyor but whereby the gripper for lifting camera backs from the loading point to the die member can be rendered inoperative independently of the other gripper by a signal indicating that an empty fixture is approaching the fourth station as the result of which no back will be present on the die member to be placed on the empty fixture when said fixture reaches said station.

11. An apparatus for testing and assembling camera fronts and camera backs according to claim 5 in which said clip applying means at said fifth station includes a pair of chutes down which metal clips are fed in end-to-end relation by gravity to spaced loading points; a clip feeding means adjacent the lower ends of said chutes and movable between two positions in the first of which the bottom-most clip in each chute is positively held and the next clip immediately adjacent the bottom most clip is released, and in the second of which positions the bottom-most clip is free to fall out of the chute and the next clip is positively held; means operated by the clip pick-up means moving between its pick-up and applying positions tending to move said clip feeding means between its two positions; a latch for normally holding said clip feeding means in its first position; and means for tripping said latch to release the pair of bottom most clips from said loading points only when there is a combined camera front and camera back in the fixture about to move into said fifth station, said last-mentioned means including a latch tripping lever reciprocated by movement of said clip pick-up means between its two positions and adapted to be moved to a latch releasing position when one arm thereof engages a combined camera front and camera back in a fixture immediately ahead of said fifth station at the time the clip pick-up means moves to its clip applying position.

12. In an apparatus for assembling a camera front to a camera back, the combination of an endless conveyor; means for intermittently indexing said conveyor through a plurality of stations; a plurality of fixtures carried by said conveyor and spaced therealong so that each time said conveyor comes to rest one of said fixtures stops at a successive one of said stations; said fixtures adapted to receive and support a camera front in definite orientation, and each including a clamping jaw movably connected thereto to move between an open position, wherein a camera front may be loaded into and removed from said fixture, and a latched position, wherein the camera front is locked in the fixture and a camera back may be placed on the camera front while held by the fixture; a loading station at which each empty fixture stops during indexing of the conveyor; means for feeding camera fronts to said loading station; means for automatically picking up a camera front from said loading station and placing it on an open fixture in said definite orientation each time one of the fixtures on the conveyor stops at said loading station; means at a station succeeding said loading station for automatically placing a camera back on each camera front moved into said station; means at a station succeeding said last mentioned station for positively fastening the combined camera front and back in assembled relation; means at a station succeeding said last mentioned station for testing the assembled camera fronts and backs to determine if they are properly secured together and adapted to automatically stop the conveyor when an improperly assembled pair is encountered; and means at the last station of said group of stations for opening the clamping jaw of each fixture and lifting the assembled camera front and back of its fixture prior to its returning to said loading station.

13. In an apparatus for assembling a camera front having a shutter equipped with a flash synchronizer circuit and a double exposure prevention mechanism to a camera back, the combination of an endless conveyor; means for intermittently indexing said conveyor through a plurality of stations; a plurality of fixtures carried by said conveyor and spaced therealong so that each time said conveyor comes to rest one of said fixtures stops at a successive one of said stations; said fixtures adapted to receive and support a camera front in definite orientation, and each including a clamping jaw movably connected thereto to move between an open position, wherein a camera front may be loaded into and removed from said fixture, and a latched position, wherein the camera front is locked in the fixture and a camera back may be placed on the camera front while held by the fixture; a loading station at which each empty fixture stops during indexing of the conveyor; means for feeding camera fronts to said loading station; means for automatically picking up a camera front from said loading station and placing it on an open fixture in said definite orientation each time one of the fixtures on the conveyor stops at said loading station; means at a succeeding station for testing one of the operating characteristics of the shutter in the camera front in the fixture when it stops at said station; a memory unit indexed in synchronism with said conveyor and including means movable from a normally inoperative position to an operative position in accordance with a fault in the operating characteristic of the shutter detected at said testing station; means moving said last mentioned means of said memory unit to said operative position as a result of the test failed; a reject chute at a succeeding reject station, means at said last mentioned reject station for automatically opening the clamping jaw of a fixture and lifting a camera front from the fixture and depositing it in said reject chute when a reject signal is received; means operated by said memory unit for producing said reject signal when a reject shutter reaches said reject station; means at a succeeding station for automatically placing a camera back on each camera front moved into said station; means at a succeeding station for positively fastening the combined camera front and camera back in assembled relation; means at a succeeding station for testing the assembled camera fronts and backs to determine if they are properly secured together and adapted to automatically stop the conveyor when an improperly assembled pair is encountered; and means at a succeeding station for opening the clamping jaw of any closed fixture and lifting the properly assembled camera front and back off of this fixture.

14. In an apparatus for assembling a camera front to a camera back, the combination of an endless conveyor; means for intermittently indexing said conveyor through a plurality of stations; a plurality of fixtures carried by said conveyor and spaced therealong so that each time said conveyor comes to rest one of said fixtures stops at a successive one of said stations; said fixtures adapted to receive and support a camera front in definite orientation, and each including a clamping jaw movably connected thereto to move between an open position, wherein a camera front may be loaded into and removed from said fixture, and a latched position, wherein the camera front is locked in the fixture and a camera back may be placed on the camera front while held by the fixture; a loading station at which each empty fixture stops during indexing of the conveyor; means for feeding camera fronts to said loading station; means for automatically picking up a camera front from said loading station and placing it on an open fixture in said definite orientation each time one of the fixtures on the conveyor stops at said loading station; means at a station succeeding said loading station for automatically placing a camera back on each camera front moved into said station; means at a station succeeding said last mentioned station for positively fastening the combined camera front and back in assembled relation; and means at the last station of said group of stations for opening the clamping jaw of each fixture and lifting the assembled camera front and back off its fixture prior to its returning to said loading station.

References Cited in the file of this patent

UNITED STATES PATENTS

| | | |
|---|---|---|
| 2,376,162 | Merriman et al. | May 15, 1945 |
| 2,477,578 | Coleman | Aug. 2, 1949 |
| 2,543,860 | Lovi | Mar. 6, 1951 |
| 2,663,421 | Reynolds | Dec. 22, 1953 |
| 2,761,559 | Burge et al. | Sept. 4, 1956 |
| 2,769,228 | Burge et al. | Nov. 6, 1956 |
| 2,829,429 | Long | Apr. 8, 1958 |
| 2,831,316 | Linde | Apr. 22, 1958 |

OTHER REFERENCES

"Plymouth Puts Forward Look Into V-8 Production," Am. Machinist, vol. 99, No. 17, Aug. 15, 1955, Sp. Rpt. No. 400 by Demrick et al.

"Data File 112" Beckman/Berkley Div. "Testing Camera Shutter Speeds With a Time Interval Meter," rec'd. Feb. 10, 1958.